US012720127B2

(12) United States Patent
Samuelson

(10) Patent No.: US 12,720,127 B2
(45) Date of Patent: Aug. 25, 2026

(54) INTELLIGENT ROUTING FABRIC FOR ASSET INSERTION IN CONTENT

(71) Applicant: Comcast Cable Communications, LLC, Philadelphia, PA (US)

(72) Inventor: Julianne Samuelson, Franktown, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 137 days.

(21) Appl. No.: 18/386,929

(22) Filed: Nov. 3, 2023

(65) Prior Publication Data

US 2024/0064347 A1 Feb. 22, 2024

Related U.S. Application Data

(63) Continuation-in-part of application No. 17/899,078, filed on Aug. 30, 2022, now Pat. No. 11,889,130,
(Continued)

(51) Int. Cl.
*H04N 21/234* (2011.01)
*H04N 21/254* (2011.01)
*H04N 21/81* (2011.01)

(52) U.S. Cl.
CPC ..... *H04N 21/23424* (2013.01); *H04N 21/254* (2013.01); *H04N 21/812* (2013.01)

(58) Field of Classification Search
None
See application file for complete search history.

(56) References Cited

U.S. PATENT DOCUMENTS 7,444,304 B2 * 10/2008 Mellinger .............. G06Q 40/00 705/37
8,909,736 B1 * 12/2014 Bosch ................... H04L 65/612 709/217
(Continued)

FOREIGN PATENT DOCUMENTS

WO WO-2014004955 A1 * 1/2014 ......... G06Q 30/0251
WO WO-2016098059 A1 * 6/2016 ........... H04H 20/106
WO WO-2020132682 A1 * 6/2020 ......... G06F 3/04817

OTHER PUBLICATIONS

USDOJ. "Criminal Justice Information Services (CJIS) Security Policy Version 5.6." (Jun. 5, 2017). Retrieved online May 16, 2025. https://www.fbi.gov/file-repository/cjis-security-policy-v5_6_20170605.pdf (Year: 2017).*
(Continued)

*Primary Examiner* — James A Reagan
(74) *Attorney, Agent, or Firm* — BakerHostetler

(57) ABSTRACT

Systems and methods presented herein provide for intelligent routing of requests for insertion of advertisements into content. A network element, communicatively coupled to content distributors and to advertisement decision servers (ADSs), is operable to receive a first set of requests from a first of the content distributors for advertisements to be inserted into content provided by the first content distributor, detect, in the requests, Personally Identifiable Information (PII) of subscribers of the first content distributor requesting the content; based in part on the PII of the subscribers, identify one or more audience segments to which the subscribers belong, remove the PII of the requests to anonymize the requests, transfer the anonymized requests with the audience segments to a first of the ADSs, receive advertisements from the first ADS for placement into the content of the first content distributor, and direct the first content
(Continued)

distributor to insert the advertisements into the requested content.

20 Claims, 15 Drawing Sheets

Related U.S. Application Data which is a continuation of application No. 17/246,189, filed on Apr. 30, 2021, now Pat. No. 11,432,022.

(56) References Cited

U.S. PATENT DOCUMENTS

| | | | | |
|---|---|---|---|---|
| 9,390,282 | B2 * | 7/2016 | Liden | G06F 21/6209 |
| 10,192,250 | B1 * | 1/2019 | Christensen | G06Q 20/123 |
| 10,320,792 | B2 * | 6/2019 | Bao | H04L 63/0428 |
| 10,845,979 | B2 * | 11/2020 | Meng | G06F 3/0485 |
| 11,030,341 | B2 * | 6/2021 | LaFever | H04L 63/0407 |
| 11,341,217 | B1 * | 5/2022 | Corral | H03M 13/09 |
| 11,392,987 | B2 * | 7/2022 | Hartzell | H04W 4/21 |
| 11,432,022 | B1 * | 8/2022 | Samuelson | H04N 21/254 |
| 11,436,600 | B2 * | 9/2022 | Ghosh | G06Q 20/34 |
| 11,755,779 | B1 * | 9/2023 | Gupta | G16H 20/10<br>726/26 |
| 12,093,426 | B2 * | 9/2024 | LaFever | H04L 9/3297 |
| 2007/0260551 | A1 * | 11/2007 | Eckleder | G06F 21/10<br>705/59 |
| 2009/0327042 | A1 * | 12/2009 | Flake | G06Q 30/0256<br>705/14.54 |
| 2011/0016479 | A1 * | 1/2011 | Tidwell | H04N 21/2668<br>725/9 |
| 2011/0208586 | A1 * | 8/2011 | Joa | G06Q 30/0255<br>235/375 |
| 2013/0013688 | A1 * | 1/2013 | Wang | H04L 67/51<br>709/204 |
| 2013/0276026 | A1 * | 10/2013 | Sherwin | H04N 21/25883<br>725/35 |
| 2013/0318346 | A1 * | 11/2013 | Libonate | H04L 43/16<br>713/168 |
| 2014/0173651 | A1 * | 6/2014 | Mathews | H04N 21/6543<br>725/34 |
| 2015/0032614 | A1 * | 1/2015 | Ghosh | G06Q 20/34<br>705/41 |
| 2016/0063269 | A1 * | 3/2016 | Liden | G06F 21/6254<br>726/26 |
| 2016/0119365 | A1 * | 4/2016 | Barel | G06F 16/95<br>726/12 |
| 2017/0053295 | A1 * | 2/2017 | Tiell | G06F 21/6227 |
| 2018/0300766 | A1 * | 10/2018 | Ashner | H04L 47/125 |
| 2019/0332807 | A1 * | 10/2019 | LaFever | H04L 63/0407 |
| 2020/0019994 | A1 * | 1/2020 | Hartzell | H04W 4/23 |
| 2020/0068236 | A1 * | 2/2020 | Whitton | H04N 21/812 |
| 2020/0225822 | A1 * | 7/2020 | Meng | G06F 3/0482 |
| 2022/0050921 | A1 * | 2/2022 | LaFever | G16H 10/60 |

OTHER PUBLICATIONS

Carnegie Mellon University. "Common Sense Guide to Mitigating Insider Threats." (2016). Retrieved online May 16, 2025. https://www.odni.gov/files/NCSC/documents/nittf/20180209-CERT-Common-Sense-Guide-Fifth-Edition.pdf (Year: 2016).*

Securosis, L.L.C. "Understanding and Selecting Data Masking Solutions: Creating Secure and Useful Data." (Aug. 10, 2012). Retrieved online May 16, 2025. https://tdwi.org/~/media/69108AD3D1084D03B3002D5AB6E9E738.PDF (Year: 2012).*

* cited by examiner

INTELLIGENT ROUTING FABRIC FOR ASSET INSERTION IN CONTENT

CROSS REFERENCE TO RELATED APPLICATIONS

This patent application is a continuation-in-part (CIP) patent application claiming priority to, and thus the benefit of an earlier filing date from, U.S. patent application Ser. No. 17/899,078, filed Aug. 30, 2022, now U.S. Pat. No. 11,889,130, issued Jan. 30, 2024, which is a continuation of U.S. patent application Ser. No. 17/246,189, filed Apr. 30, 2021, now U.S. Pat. No. 11,432,022, issued Aug. 30, 2022, the contents of each of which are hereby incorporated by reference.

BACKGROUND

Television networks, such as the American Broadcasting Company (ABC), the Columbia Broadcasting Company (CBS), and the National Broadcasting Company (NBC), have for years broadcast television shows to the masses as a means for generating revenue through advertising. For example, these networks produce television shows and then seek out sponsors to advertise on the shows. The television shows, or "content," have designated timeslots in which the sponsors' advertisements, or "assets," are inserted. The content and the inserted assets are then broadcast by the television networks, or "content providers," to the public over federally licensed communication airways, often referred to as linear video distribution.

This "shotgun" approach to advertising proved to be very successful in the beginning. However, as the number of advertisers wishing to sell their goods and services substantially increased, television evolved into a much more complex system of communications. For example, cable television providers, satellite television providers, streaming content providers (collectively referred to herein as content distributors) now serve as an intermediary between the content providers and the intended public audience. And, the number of content providers has increased accordingly. In this regard, many members of the general public have signed on as customers of the content distributors so as to receive a broader availability of content.

Because the market for content consumption has grown, the number of content distributors has also grown. And, because each of these distributors has its own method of content delivery, the manner in which the content and assets are delivered to the customers has become increasingly complex. Generally, the content providers deliver the content to the content distributors with instructions to insert various advertising (also referred to as "assets") into the content at certain times. For example, if a company wishes to run a national advertisement campaign targeting a certain television show associated with a particular demographic, the company may purchase one or more timeslots, or "placement opportunities," within that television show from the content provider to air assets advertising the goods and services of the company. The content provider then provides the content to each of the content distributors with directions to insert the assets within the timeslots purchased by the company. However, as the number of content providers and advertisers has grown and as consumer tastes have become more diverse, it has become more difficult for content providers to directly sell placement opportunities to the advertisers that benefit the content providers.

Accordingly, advertisement decisioning systems (ADSs) have been developed to directly sell advertisement opportunities that target subscribers of content distributors. These ADSs improve advertising because they can directly target subscribers of content distributors to provide meaningful impressions with the subscribers. And, this "On Addressability" initiative offers content providers and their advertisers the ability to target specific audience segments. However, the content distributors have data privacy laws that generally prevent the communication of any subscriber related data (e.g., names, addresses, ages, etc.) to third-party ADSs in order to protect their respective subscribers.

SUMMARY

Systems and methods presented herein provide audience obfuscation. In one embodiment, a system includes an audience obfuscation network element communicatively coupled to a plurality of content distributors and to a plurality of advertisement decision servers (ADSs). The network element is operable to receive a first set of requests from a first of the content distributors for advertisements to be inserted into content provided by the first content distributor, and to detect, in the requests, Personally Identifiable Information (PII) of subscribers of the first content distributor requesting the content. Based in part on the PII of the subscribers, network element is operable to identify one or more audience segments to which the subscribers belong, to remove the PII of the requests to anonymize the requests, to transfer the anonymized requests with the audience segments to a first of the ADSs, to receive advertisements from the first ADS for placement into the content of the first content distributor, and to direct the first content distributor to insert the advertisements into the requested content.

The various embodiments disclosed herein may be implemented in a variety of ways as a matter of design choice. For example, the embodiments may take the form of physical machines, computer hardware, software, firmware, or combinations thereof. In another embodiment, a computer readable medium is operable to store software instructions for resolving conflicts related to the directed insertion of assets into content. These software instructions are configured so as to direct a processor or some other processing system to operate in the manner described above. Other exemplary embodiments are described below.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below.

Figure 1:
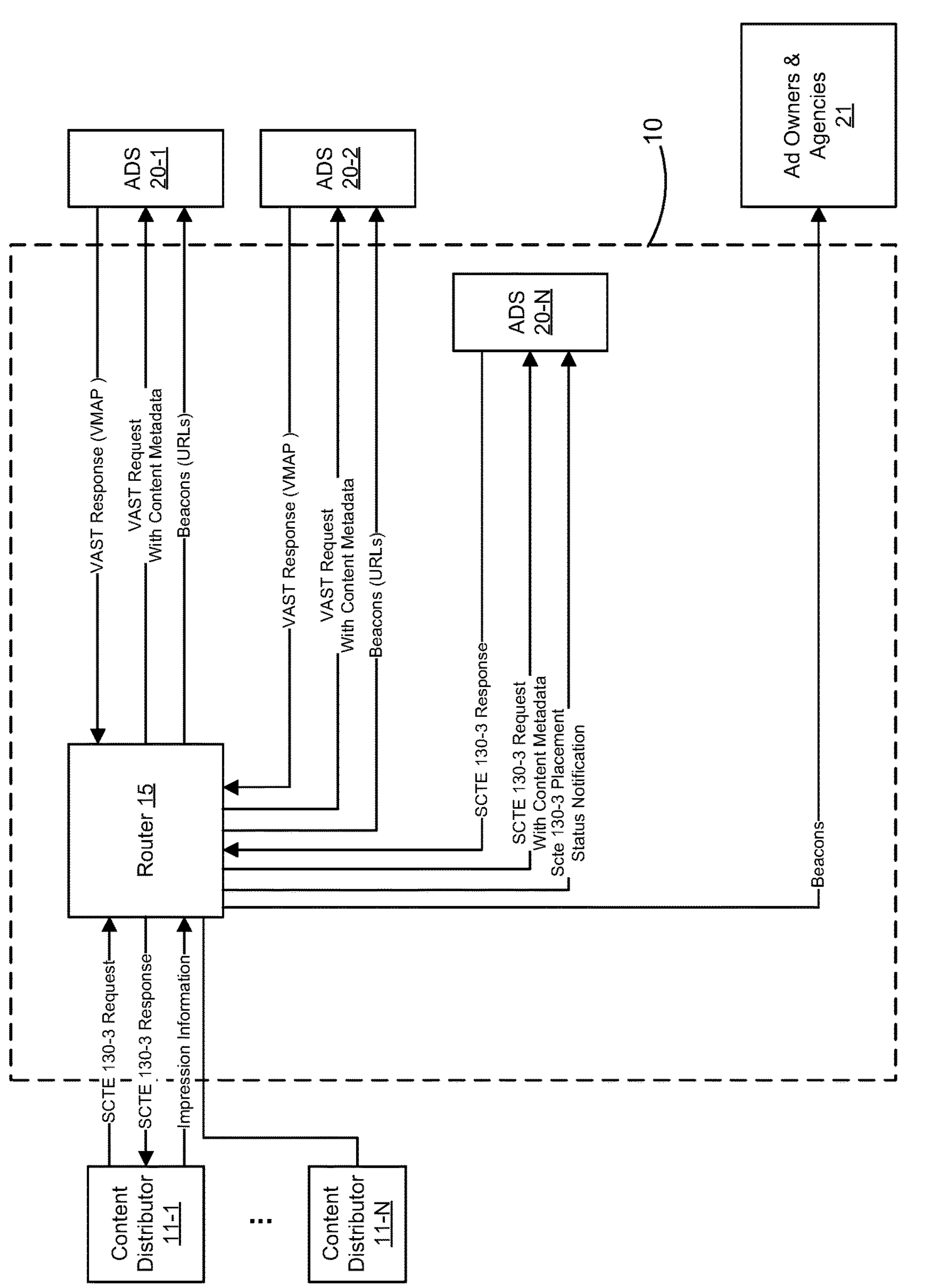
FIG. 1 is a block diagram of an exemplary intelligent routing fabric for asset insertion in content.

FIG. 1 is a block diagram of an exemplary intelligent routing fabric 10 for asset insertion in content. Generally, the intelligent routing fabric 10 is configured with a network element, such as a server or other computing system, to communicate through a network with a plurality of content distributors 11-1-11-N and a plurality of advertisement decisioning systems (ADSs) 20-1-20-N (where the reference "N" is an integer greater than "1" and not necessarily equal to any other "N" reference herein). In this embodiment, the intelligent routing fabric 10 includes a router 15 that is operable to receive and process requests from the content distributors 11-1-11-N for assets to be inserted into the respective contents being requested by subscribers to the content distributors 11. The router 15 may route the requests to ADSs 20-1-20-N to receive assets (e.g., advertisements and other "creatives") for insertion into the content being provided to the subscribers. That is, the content distributors 11 send requests for assets to be inserted into the asset insertion opportunities of the content being selected by their subscribers, and the ADSs 20 determine which assets to deliver for those insertion opportunities. The ADSs 20 then deliver the assets to the content distributors 11, and the router 15 handles the routing of the assets and the requests between the content distributors 11 and the ADSs 20. In this regard, the router 15 may be any device, system, software, or combination thereof operable to communicate requests and responses between the content distributors 11 and a plurality of ADSs 20.

In one embodiment, the router 15 receives Society of Cable Telecommunications Engineers (SCTE) 130-3 requests from the content distributors 11 for advertisements to be inserted into content provided by the content distributors 11. However, some of the ADSs 20 are not configured for receiving SCTE 130-3 requests. So, the router 15 may translate those SCTE 130-3 requests into Video Ad Serving Template (VAST) requests for at least a portion of the ADSs 20 (e.g., the ADSs 20-1 and 20-2) that are configured for receiving VAST requests. The router 15 may also transfer SCTE 130-3 requests to ADSs 20, such as the ADS 20-N, that are configured to receive SCTE 130-3 requests. In whatever fashion, the router 15 may make the requests to one or more of the ADSs 20-1-20-N in parallel to reduce round-trip latency to the content distributor 11.

In response to these VAST and SCTE 130-3 requests, the router 15 may receive advertisements from the ADSs 20 for placement into the content. For example, when the content distributor 11-1 requests advertisements for content being viewed by a subscriber of the content distributor 11-1, the router 15 may contact the ADSs 20-1 (e.g., a primary ADS 20 of the content distributor 11-1) for advertisements. However, the ADS 20-1 may respond with advertisements that do not totally fulfill the request from the content distributor 11-1. Thus, as the router 15 has sent out the requests to other ADSs 20, such as the ADSs 20-2-20-N, the router 15 may receive advertisements from those ADSs 20 as well. The router 15 may then determine which advertisements provide the content distributor 11-1 with the most revenue. That is, the router 15 may select advertisements from the other ADSs 20 that provide the greatest value to the content provider. The router 15 may then deliver those advertisements to the content distributor 11-1 via an SCTE 130-3 response. In some embodiments, the router 15 may route (i.e., and translate where needed) the requests to all of the ADSs 20 and receive advertisements from one or more the ADSs 20. In this regard, the router 15 may determine which advertisements provide the most revenue to the content provider while at the same time ensuring that all of the advertisement opportunities for the content of the content distributor 11-1 are fulfilled.

In the instances where the ADSs 20 communicate via VAST requests and responses, the router 15 may translate the VAST responses from those ADSs 20 into SCTE 130-3 responses to the content distributor 11. More specifically, the router 15, being able to communicate via VAST and SCTE 130-3, may extract the advertisements from the VAST responses of the ADSs 20 and/or SCTE 130-3 responses, such as those from the ADS 20-N. The router 15 may then bundle those advertisements into a single SCTE 130-3 response and transfer that response with the advertisements to the content distributor 11 making the request.

For the ADSs 20 configured for communicating via VAST (e.g., the ADSs 20-1 and 20-2), those ADSs 20 may configure the VAST response as a Video Multiple Ad Playlist (VMAP) response comprising one or more tracking URLs to advertisements. A VMAP response generally includes an Extensible Markup Language (XML) template that allows the content distributors 11 to describe structure for insertion of advertisement inventory into content. Thus, the router 15 may translate the VMAP responses from the ADSs 20-1 and 20-2 into an SCTE 130-3 response to direct the content distributors 11 to insert the advertisements from the ADSs 20-1 and 20-2. In this regard, the router 15 may process a VMAP response from an ADS 20 to extract the advertisements therefrom and select the advertisements that provide the most value to the content programmer making the request. Alternatively or additionally, the router 15 may select advertisements from the ADSs 20 that are configured to communicate via SCTE 130-3.

Generally, the tracking URLs (or "beacons") that are present in an ADS 20 VMAP response are harvested to a datastore of the router 15 (or external to the router 15). Once an end user has completed a content selection, the content distributor 11 may send the router 15 an SCTE 130-3 PlacementStatusNotification message that indicates which advertisements were viewed as a result of the insertion. The router 15 may then transfer the associated beacons for the advertisements that were harvested to the ADS(s) 20 providing the advertisements and/or to third-party advertisement servers to notify them of the views or "impressions".

In some embodiments, the router 15 may contact an ADS 20 for at least one advertisement to be inserted into the advertisement insertion opportunity when the router 15 detects that one or more of the ADSs 20 cannot fulfill a request for advertisements on its own. For example, an advertisement insertion opportunity may avail itself and cannot be filled by a content distributor 11's primary ADS 20. If a content provider seeking advertisements authorizes a "backfill" of advertisements, the router 15 may seek to backfill the advertisement insertion opportunity via advertisements from one or more of the other ADSs 20. To illustrate, the router 15 may determine that the content distributor 11-1's primary ADS is the ADS 20-1. The router 15 may also determine that the ADS 20-1 cannot fulfill all the advertisement insertion opportunities of a particular content of the content distributor 11-1. The router 15 may then contact one or more of the other ADSs 20-2-20-N in parallel to contacting the ADS 20-1 to fulfill the advertisement insertion opportunity.

In some embodiments, the router 15 may determine which of the ADSs 20 may provide a better asset insertion for the content. This may involve determining which of the ADSs 20 may improve revenue for the content provider and/or the content distributor 11. For example, if the router 15 determines that the ADS 20-N improves revenue, the router 15 may transfer a request (either VAST or SCTE-130-3) with the content metadata directly to the ADS 20-N, such that the ADS 20-N can fulfill all of the advertisement opportunities.

In some embodiments, the router 15 may be configured to detect timeouts by any of the ADSs 20. For example, when a VAST request is transferred to the ADS 20-1 and the router 15 does not receive a VAST response from the ADS 20-1, the router 15 may use advertisements from any of the other ADSs 20 for advertisements for placement in the content, even if the other ADSs 20 are not considered primary ADSs of the content distributor 11. Once the router 15 receives responses to those requests, the router 15 formats the responses in an SCTE 130-3 response to one or more the content distributors 11 to direct those content distributors 11 to insert the advertisements into the content.

The predetermined amount of time for determining a timeout may be established as a matter of design choice. However, this threshold amount of time is generally as small as possible so as to fulfill the advertisement insertions in the content as close to real time as possible. For example, when the router 15 receives an SCTE 130-3 request for advertisements from one of the content distributors 11, the router 15 may translate the request into a VAST request for the ADS 20 and then transfer the request to the ADS 20 in substantially real time. In the case where no translation is needed, the router 15 may route the request to the ADS 20 (e.g., the ADS 20-N) in parallel with the VAST request(s). Then, after a brief period (e.g., milliseconds) and no response is received from an ADS 20, the router 15 may automatically disengage the timed out ADS 20 from providing advertisements to a particular content selection.

To illustrate, if the router 15 transfers requests to two ADSs 20 and both of those ADSs 20 respond within their configured timeout periods, the router 15 may forward advertisements to the content distributor 11 with advertisements from both of those ADSs 20 (i.e., assuming that those advertisements fulfill the request and return the most value). However, if one of those ADSs 20 "times out", then the router 15 may forward only the advertisements to the content distributor 11 from the ADS 20 that responded in time. If both ADSs 20 timeout, then the router 15 may respond to a content distributor 11 stating that the available advertisement opportunities cannot be fulfilled at this time. In this instance, the router 15 may direct the content distributor 11 to leave the available advertisement opportunities empty or provide alternative content to fill the advertisement opportunities (e.g., commercials pertaining to various programming provided by the content distributor 11, public service announcements, etc.).

In some embodiments, advertisement owners and agencies may sell a campaign of advertisements to an ADS 20 to have their advertisements inserted into the content of a content distributor 11. Then, the ADS 20 may deliver those advertisements in the VAST responses or SCTE 13-3 responses to the router 15, when requested. However, these advertisement campaigns are not indefinite. Rather, they have timelines, financial constraints, and/or other rules for inserting those advertisements. Thus, when an advertisement campaign expires, the ADS 20 cannot fulfill the advertisement insertions in the content with that advertisement campaign. Thus, in some embodiments, the router 15 may request that another ADS 20 may fulfill the request of the content distributor 11.

In some embodiments, the router 15 may generate one or more beacons for each response received from an ADS 20. For example, when a content distributor 11 receives a set of advertisements for insertion into the content being provided to the subscribers of the content distributor 11, the content distributor 11 inserts those advertisements into that content. Then, the content distributor 11 monitors the customer premise equipment (CPEs) of the subscribers (e.g., set-top boxes, smart televisions, smart phones, computers, tablet computers, etc.) to observe viewing statistics pertaining to the inserted advertisements. The content distributor 11, in turn, reports those views back to the router 15. Alternatively or additionally, the content distributor 11 may also detect any potential actions by the subscribers that would counter viewing those inserted advertisements (e.g., changing channels, turning off the device, changing volume, etc.). For example, if a subscriber performed an action that would counter the inserted advertisements from being viewed, that information will be reported back by the content distributor 11 to the router 15. In any case, the router 15 may generate a beacon indicating impression information and transfer it to the ADS 20 fulfilling the request.

Additionally, the router 15 may report the impression information via beacons to the content provider's ADS as well as to third party ad agency servers. This feedback is near real time. If there are adjustments to advertising campaigns (e.g., flight window extensions, impression goal adjustments, etc.), those may be made by the content provider in the campaign manager of the content provider's ADS. Alternatively or additionally, the router 15 may maintain the impression information over some period of time so as to indicate how effective the inserted advertisements are performing. For example, if a campaign of advertisements of ad owners and/or agencies is being used by an ADS 20 to fulfill advertising opportunities in the content of the content distributors 11, the router 15 may receive the impression information from the content distributors 11 and retain that information so as to evaluate how well the campaign is performing. The router 15 may periodically (or in real time) update the ad owners and agencies 21 as to the performance of that campaign such that the advertisement owners and agencies 21 may reconfigure the campaign if necessary.

The router 15 may also collect and retain other information, such session data, opportunity data, and placement data. Session data generally regards a VOD session as a piece of entertainment content being view on-demand by a subscriber. The session data may describe the name/type of content being viewed and/or how long that content is being viewed. Opportunity data regards the original ad slots (e.g., asset opportunities) that are available for ad content to be filled. Some of these ad slots may be filled by a primary ADS, and some that are leftover may ultimately be back-filled by a secondary ADS. This data may also include how many opportunities were unused during a particular content and/or a subscriber's session, with the goal being to have all advertisement opportunities filled. And, placement data generally describes the ads that were inserted into asset opportunities. The router 15 may use this data to generate reports for content providers, content distributor 11, ADS vendors (e.g., advertisement owners and agencies) for the purpose of service assurance.

Generally, the content distributors 11 have access to the household identifications (HHIDs) which may include Personally Identifiable Information (PII) of the subscribers (e.g., phone numbers, set top box IDs, addresses, names, recent purchases, etc.). This information is included in the requests to the intelligent routing fabric 10. Some of the ADSs 20 are permitted access to this information, however, others are not. In the instances where the ADSs 20 are not permitted access to the PII, the intelligent routing fabric 10 strips the PII from the requests before transferring the requests to those ADSs 20.

It should be noted that the processes disclosed herein may occur in substantially real-time to deliver thousands, even millions or more of advertisements per hour. For example, the router 15 may be communicatively coupled to a plurality of content distributors 11. And, the content distributors 11 may be delivering content to thousands or even hundreds of thousands of subscribers at any given moment in time. Moreover, there may be hundreds of ADSs 20 providing advertisements to the router 15 to fulfill advertisements requests to those content selections. Accordingly, one skilled in the art would readily recognize that this automated advertisement request and delivery via the router 15 provides many advantages over the prior art including, for example, real-time advertisement decisioning, real-time advertisement request routing, real-time advertisement response routing, and increased value to the content distributors 11 and/or the content providers via the fulfillment of all or nearly all available advertisement opportunities in content.

It should also be noted that the available advertisement opportunities may be predetermined or determined "on the fly." For example, in some instances the selected content may be preconfigured with advertisement opportunities (e.g., a pre roll position, a mid-roll position, and a post roll position). In these instances, the content distributor 11 may generate an SCTE 130-3 request to the router 15 to fulfill all those advertisement opportunities when the subscriber selects the content. However, the content distributor 11 may generate a request for each of these advertisement opportunities as they are approaching. For example, when a subscriber is viewing a content selection and the mid-roll position is approaching (i.e., in time), the content distributor 11 may then generate the SCTE 130-3 request for advertisements to fulfill the available advertisement opportunities in the mid-roll position.

Figures 2, 3:
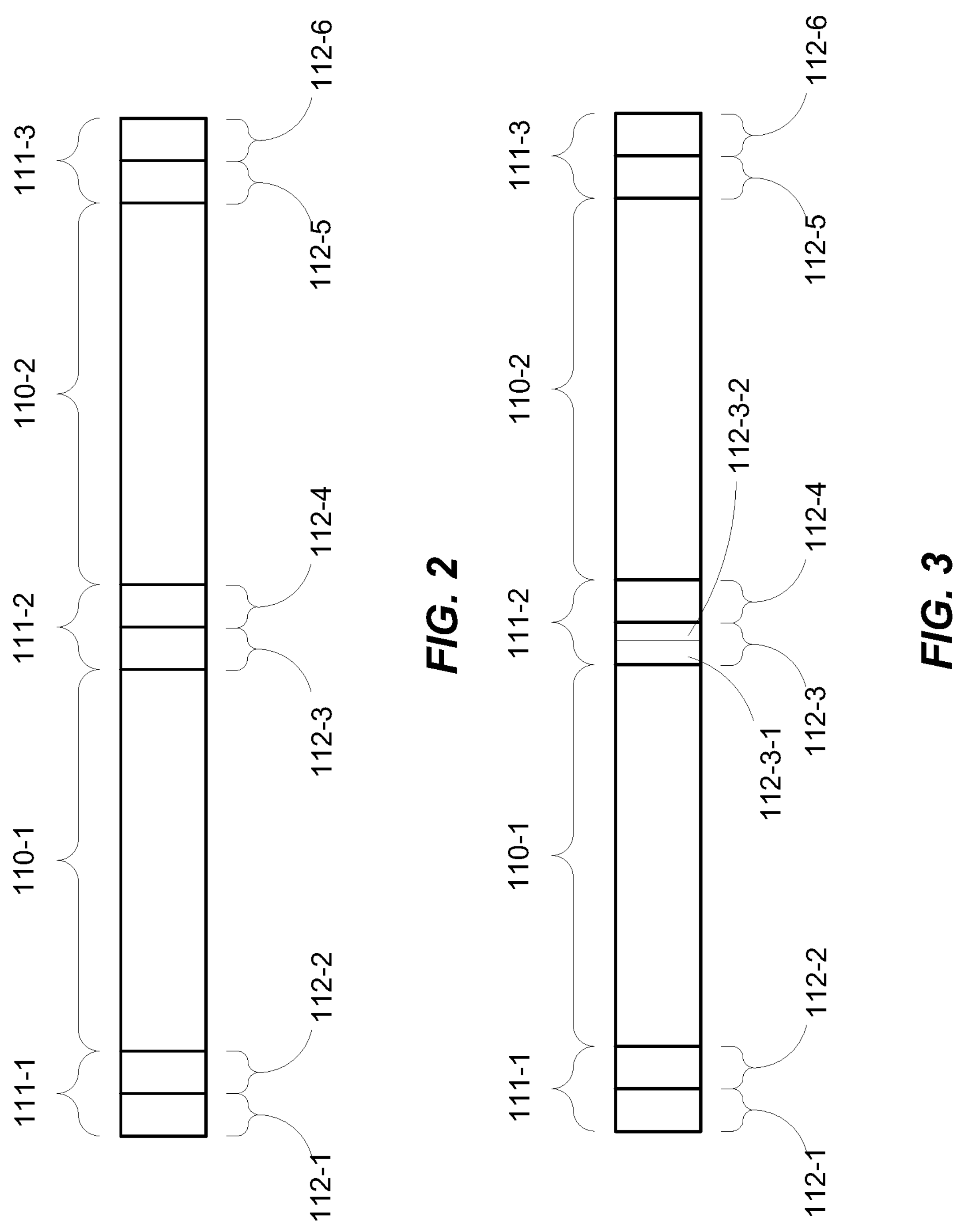
FIG. 2 is an exemplary timing diagram of content interlaced with asset timeslots.
FIG. 3 is another exemplary timing diagram of content interlaced with asset timeslots.

To illustrate the insertion of assets into content, FIGS. 2 and 3 shows an exemplary timing diagram of content 110 interlaced with asset timeslots 111, also known as "break positions". When the content distributor 11 receives a message from a CPE, such as a TV, a computer, a tablet computer, a smart phone, a set-top box, or the like) for the content 110, the content distributor 11 retrieves the content 110 for delivery to the subscriber's CPE. The content 110, in this embodiment, is divided into two segments 110-1 and 110-2 with timeslots 111 disposed at the front end of the content 110-1 (i.e., timeslot 111-1 at the pre roll position), in between the content segments 110-1 and 110-2 (i.e., timeslot 111-2 at the mid roll position), and at the end of the content segment 110-2 (i.e., timeslot 111-3 at the post roll position). Each timeslot 111 is divided into two asset placement timeslots 112, or "placement opportunities", each of which being capable for accepting an asset that is typically, but not always, 30 seconds in duration. Thus, a placement opportunity is generally a subset of time of a particular timeslot 111. The ADS 20 directs the content distributor 11 to insert the assets according to a particular ranking that provides value for content distributor 11 and/or a content provider (e.g., monetary value, enhanced relationships with asset providers, etc.). In this regard, the ADS 20 may transfer assets to the content distributor 11 via URLs for insertion into the asset timeslots 112-1-112-6 based on the ranking provided by the ADS 20.

Also, the invention is not intended be limited to any particular number of content segments 110 or any particular number of asset timeslots. In fact, an asset timeslot 112 may be subdivided for insertion of multiple assets. For example, television commercials are typically 30 seconds in length. Occasionally, however, asset providers can reduce the overall duration of a particular asset (e.g., by removing a portion of a 30 second commercial to reduce it to a 15 second commercial). Accordingly, a 30 second asset timeslot 112 may be configured to accept insertions of two 15 second assets. An example of such is illustrated in FIG. 3. In FIG. 3, the content 110 is illustrated with the mid roll timeslot 111-2 having two 30 second asset timeslots 112-3 and 112-4. The asset timeslot 112-3 is further divided into two 15 second asset timeslots 112-3-1 and 112-3-2, allowing for the insertion of two 15 second assets into the asset timeslot 112-3. Still, the invention is not intended to be limited to any particular asset duration, asset timeslot 112 duration, or timeslot 111 duration as such may be configured to meet certain business and/or technical needs.

It should be noted that the decisions regarding the direction of asset insertions occur quite rapidly. For example, the ADS 20 may be operable to make asset insertion decisions for a plurality of content distributors 11. And, each content distributor 11 may be operable to provide content to a plurality of CPEs at any given time (e.g., thousands or more at once). Thus, when a content selection is made by a particular CPE, the ADS 20 responds in substantially real time to ensure that the content distributor 11 has ample time to retrieve and insert the assets while processing the content selected by the CPE. In this regard, the intelligent routing fabric 10 may be processing/translating thousands or more requests and responses. In some embodiments, the number of requests and responses could number in 1000 per hour, 10,000 per hour, 100,000 per hour, or even 1 million per hour or more.

Figure 4:
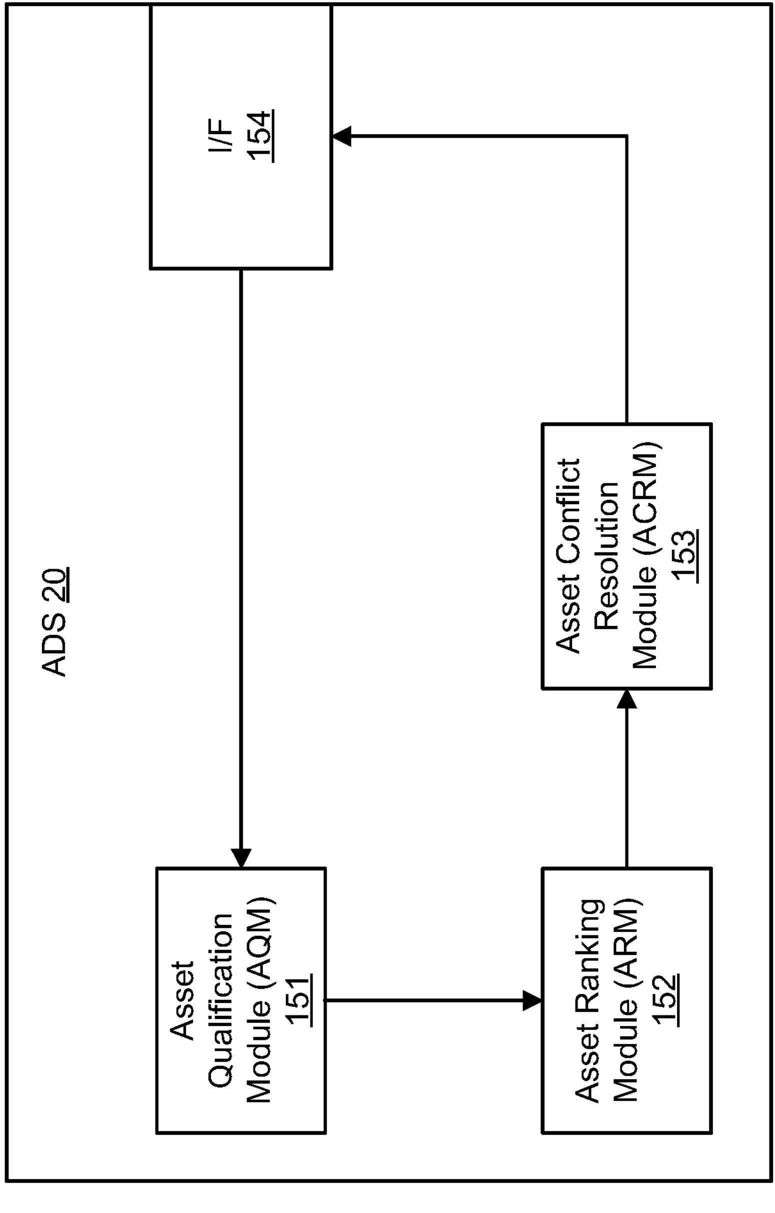
FIG. 4 is block diagram of an exemplary ADS.

FIG. 4 is a block diagram of an exemplary ADS 20. In this embodiment, the ADS 20 includes an interface 154, an asset qualification module (AQM) 151, an asset ranking module (ARM) 152, and an asset conflict resolution module (ACRM) 153. The interface 154 is any device or system operable to receive information pertaining to a content selection by a CPE such that the ADS 20 may direct asset insertion into the selected content. In this regard, the interface 154 may also be operable to transfer information to the content distributor 11 via the intelligent routing fabric 10 to direct the content distributor 11 to insert certain assets.

The AQM 151 is any device or system operable to communicate with the interface 154 to initially qualify assets for insertion within the content. The AQM 151 may exclude certain assets from insertion into the content selected by the CPE. The ARM 152 is any device or system operable to rank the remaining assets (i.e., those not already excluded by the AQM 151) for insertion to the content 110. The ACRM 153 is any device or system operable to remove any ranked assets from insertion into the content 110 based on conflicts between assets. For example, the ACRM 153 may determine that assets from certain advertisers conflict with one another (e.g., Coke and Pepsi). Accordingly, the ACRM 153 may be operable to prevent assets from these advertisers from being inserted within a same timeslot 111 or even within a same content 110. The exemplary operations of the AQM 151, the ARM 152, and the ACRM 153 are explained in greater detail below in FIGS. 5-11.

Figure 5:
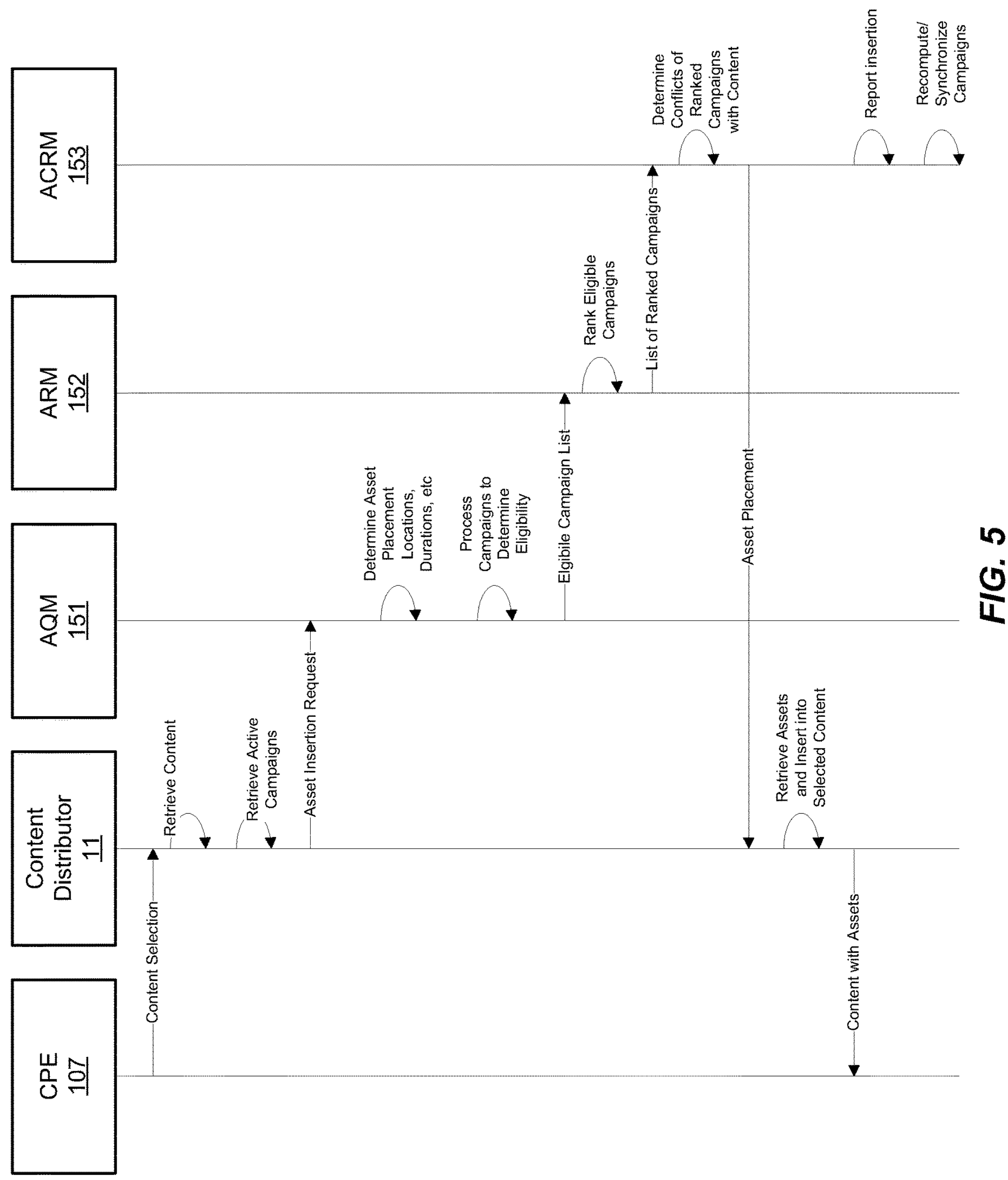
FIG. 5 is an exemplary message diagram of the ADS of FIG. 5.

FIG. 5 is an exemplary message diagram of an ADS 20. Initiation of the asset insertion begins when a CPE 107 selects a particular content provided by the content distributor 11. The content could be linear and/or on-demand. For example, with linear content, a CPE may switch channels, be turned off, etc. The content distributor 11 reports these statistics to the audience obscuration system 10, which may then forward the statistics to the ADS 20. With content on demand (COD), part of the viewing statistics may include the actual selection of the COD content. Similarly, the content distributor 11 reports the statistics to the intelligent routing fabric 10, which may again then for the statistics to the ADS 20.

The CPE 107 transfers a content request to the content distributor 11 which in turn retrieves the content. The content distributor 11 may also retrieve active campaigns. For example, each asset provider may generate an advertising campaign with one or more campaign items. Each of these campaign items may be associated with one or more assets of the asset provider designating the desired time, date, content, audience/demographic, etc., for which the assets are to be inserted into selected content. The content distributor 11 may retrieve the active campaigns of the asset providers and generate an asset insertion request for the AQM 151 of the ADS 20.

Upon receiving the request, the AQM 151 may determine certain parameters relating to the placement of the assets. For example, the AQM 151 may determine durations of the assets and various placement opportunities for the assets (i.e., appropriate timeslots within the selected content). The AQM 151 may also process the active campaigns to determine their eligibility within the content to generate a list for the ARM 152 such that the ARM 152 may rank and select eligible campaigns from that list. In doing so, the AQM 151 may exclude certain campaigns from the list based on various criteria, such as whether the asset provider and/or the asset itself are valid and whether the insertion opportunities themselves are valid. An embodiment of the AQM 151 is exemplarily shown in greater detail below in FIGS. 6-8.

Once the ARM 152 receives the eligible campaign list, the ARM 152 ranks the various campaign items that include assets of the campaigns for insertion into the content selected by the CPE 107. The ARM 152 may rank the campaign items based on, among other things, their value to the content provider and/or the content distributor 11, the strategy of the campaign, and the priority of the campaign. An embodiment of the ARM 152 is exemplarily shown and described in greater detail below in FIG. 9. The ranked list of eligible campaign items is then generated and transferred to the ACRM 153 which determines whether any conflicts exist among the ranked campaign items. The ACRM 153 excludes certain assets of campaigns from insertion when they conflict with others in the content selected by the CPE 107. For example, when one campaign conflicts with another campaign in the list for a particular selected content, the asset of the higher ranked campaign may be inserted into the content effectively excluding the lower-ranked campaign from that content. An embodiment of the ACRM 153 is exemplarily shown and described below in FIGS. 10 and 19.

Once the ACRM 153 removes conflicts from the ranked list of possible campaigns, the ACRM 153 may transfer URLs of the assets to the content distributor 11, which in turn inserts the assets into the timeslots of the selected content. The ACRM 153 can thus direct insertion of assets "on the fly" whenever opportunities are available in the content.

After the content is delivered to the CPE 107 with the inserted assets, the ADS 20 reports the insertion (e.g., to the content distributor 11 and/or the asset providers) and recomputes and/or synchronizes campaigns for another content selection by a CPE 107. For example, once certain goals have been met for a particular campaign, the achieved goals may lower the ranking of that campaign or even exclude it from future insertions in selected content. Accordingly, the ADS 20 may retain information pertaining to the insertion of assets for use in determining subsequent asset insertions.

In one embodiment, the ADS 20 may receive information from the content distributor 11 indicative of actual views of the inserted assets. For example, the content distributor 11 may be operable to access a CPE 107 to determine when a content selection is stopped such that a portion of the asset insertions are not seen by the viewer of the content selection. This information may be transferred back to the ADS 20 such that the campaign data of those non-viewed assets can be compensated or corrected. In other words, when assets are inserted into content selections and they are not viewed because of some action on the part of the viewer, such as stopping or fast forwarding the content selection, the campaigns of those assets should not be influenced. Accordingly, the ADS 20 may take this information into consideration and recompute how close the campaign is to meeting its targeted goal for views.

It should be noted that the invention is not intended to be limited to any particular messaging format. In some embodiments, the ADS 20 interacts with the intelligent routing fabric 10 using the standards established by the Society of Cable Television Engineers (SCTE). In other embodiments, the ADS 20 interacts with the content distributor 11 using an Entertainment Identifier Registry (EIDR). EIDR provides a manner in which content and assets may be tagged with unique identifiers that are operable to distinguish the content and assets from one another. For example, content and assets generally have associated metadata to distinguish themselves from one another based on various aspects, such as age, maturity level, actors, products, and the like. EIDR identifiers are generally capable of incorporating this metadata to provide a compact means for uniquely tagging the content and assets for rapid identification due in part to its central registration. That is, each particular content and asset is identified with a unique EIDR identifier that is maintained by central registration system so that individual content distributors and the like may quickly identify and use the registered content and assets. In other embodiments, the ADS may communicate via VAST signaling.

To provide more context to the operations of the ADS 20, the following example is provided.

The CPE 107 selects a particular episode of the television show "30 Rock" at 8 pm on a Thursday night from a menu of content that is presented by the content distributor 11. As with many other 30-minute situational comedies, this episode of 30 Rock includes two content sections 110-1 and 110-2 and the three timeslots 111-1, 111-2, and 111-3, as illustrated in FIG. 2. Using this example, the content distributor 11 transfers an asset insertion request to the AQM 151 to insert assets into these three timeslots. The AQM 151 then determines that there is a total of six 30 second asset placement opportunities within three timeslots 111-1-3 of the selected content 110. The AQM 151 then processes the active campaigns to determine their eligibility within those six 30 second asset placement opportunities. Among the active campaigns in this example are:

1. A Coca-Cola campaign with a total of four assets and 3 campaign items directing placement opportunities of those assets as follows:
   a) Asset 1 for 100 views anytime;
   b) Asset 2 for any viewing opportunities Monday through Friday between the hours of 5 pm and 10 pm; and
   c) Assets 3 and 4 for any viewing opportunities Friday and Saturday between the hours of 5 pm and 10 pm.
2. A Pepsi-Cola campaign with a total of five assets and four campaign items directing placement opportunities of those assets as follows:
   a) Asset 1 for 20 views anytime;
   b) Asset 2 for 100 views anytime;
   c) Asset 3 for 1000 views anytime;
   d) Asset 4 for any viewing opportunities Monday through Friday between the hours of 5 pm and 10 pm; and
   e) Asset 5 for any viewing opportunities Friday and Saturday between the hours of 5 pm and 10 pm.
3. A Capital One credit card campaign with a total of four assets and three campaign items directing placement opportunities of those assets as follows:
   a) Asset 1 for 100 views anytime;
   b) Asset 2 for 1000 views anytime; and
   c) Assets 3 and 4 for any viewing opportunities Monday through Friday between the hours of 5 pm and 10 pm.
4. A Chrysler Motors campaign with a total of three assets and two campaign items directing placement opportunities of those assets as follows:
   a) Asset 1 for 100 views; and
   b) Assets 2 and 3 for any viewing opportunities Monday through Friday between the hours of 5 pm and 10 pm.
5. A Nickelodeon campaign with one asset and one campaign item directing placement opportunities of that asset as follows:
   a) Asset 1 for 100 views.

Since the television show 30 Rock has a mature theme and since the Nickelodeon campaign is directed towards a younger audience, that campaign item is automatically excluded from the eligible campaign list by the AQM 151. Other remaining campaign items are excluded based on time and date (i.e., campaign items 1c and 2e).

Thus the remaining campaigns of 1a-1b, 2a-2d, 3a-c, 4a-4b are transferred to the ARM 152 for ranking. Based on various factors explained in greater detail below, the ARM 152 ranks the campaigns as follows:

1. Campaign Item 2a
2. Campaign Item 1a
3. Campaign Item 3c
4. Campaign Item 2b
5. Campaign Item 4b
6. Campaign Item 4a
7. Campaign Item 1b
8. Campaign Item 1d
9. Campaign Item 2c
10. Campaign Item 1c
11. Campaign Item 2d
12. Campaign Item 3a
13. Campaign Item 3b The ARM 152 transfers this ranked list of campaign items to the ACRM 153 to determine conflicts within the ranked list of campaign items. Typically, the six available asset placement opportunities 112-1-6 within the content 110 would be filled by the first six campaign items based on a rank determined by the ARM 152. However, since some conflicts may exist between campaigns within a particular content and/or timeslot, certain campaigns may be excluded from the placement opportunities 112 such that the ranking is reordered. For example, certain criteria may dictate that a Pepsi Cola asset may not be placed within the same content as a Coca-Cola asset. In this regard, the campaign items 1a-1d are removed from the ranked list because the Pepsi-Cola asset has the higher initial ranking, leaving the following campaign items:

1. Campaign Item 2a
2. Campaign Item 3c
3. Campaign Item 2b
4. Campaign Item 4b
5. Campaign Item 4a
6. Campaign Item 2c
7. Campaign Item 2d
8. Campaign Item 3a
9. Campaign Item 3b With this computed, the ACRM 153 may remove the final three campaign items 7, 8, and 9 from the list as the six placement opportunities can be filled with assets. The ACRM 153 then transfers this information regarding asset placement to the content distributor 11. Other more specific embodiments are shown below.

Figure 6:
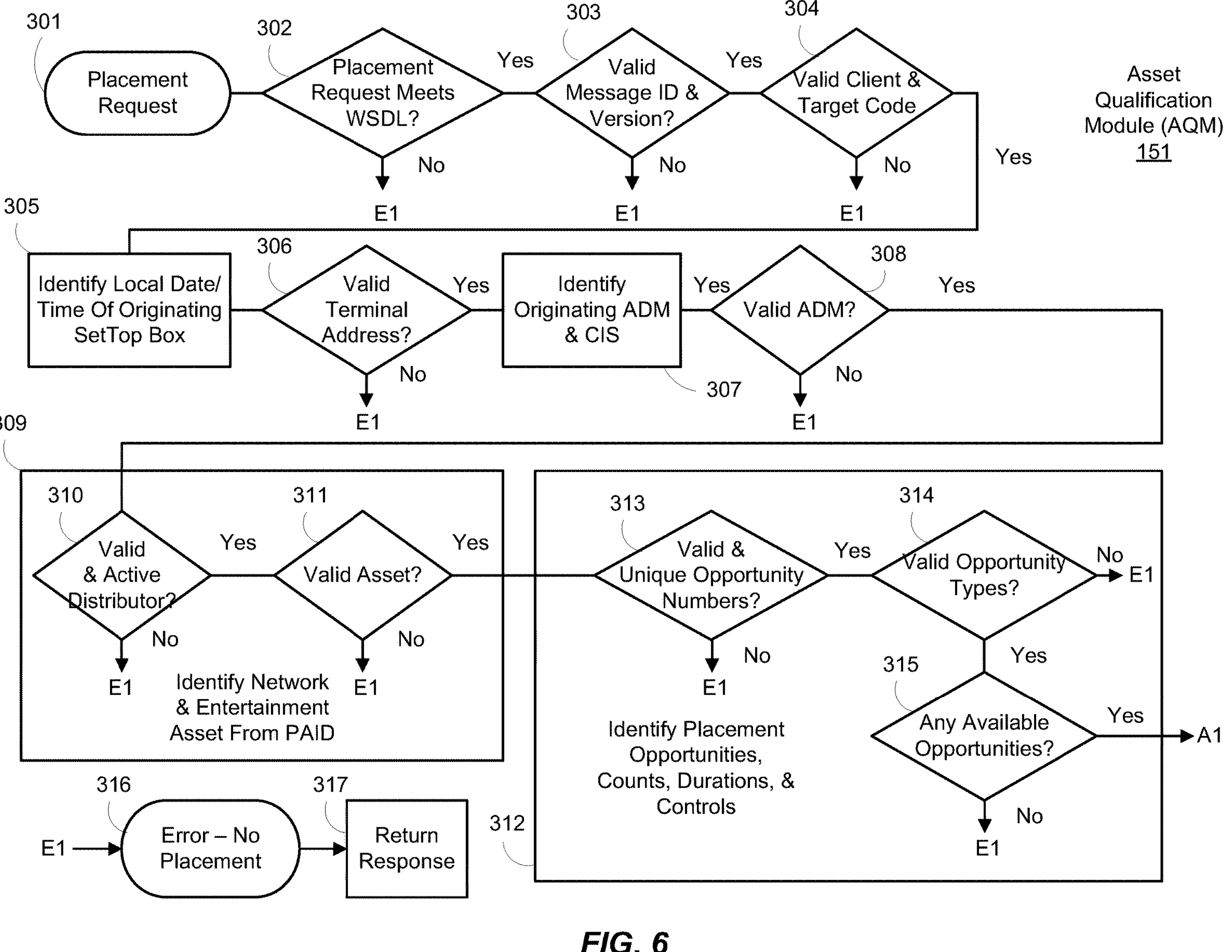
FIGS. 6-8 are exemplary flowcharts of an Asset Qualification Module (AQM) within an ADS.
Figure 7:
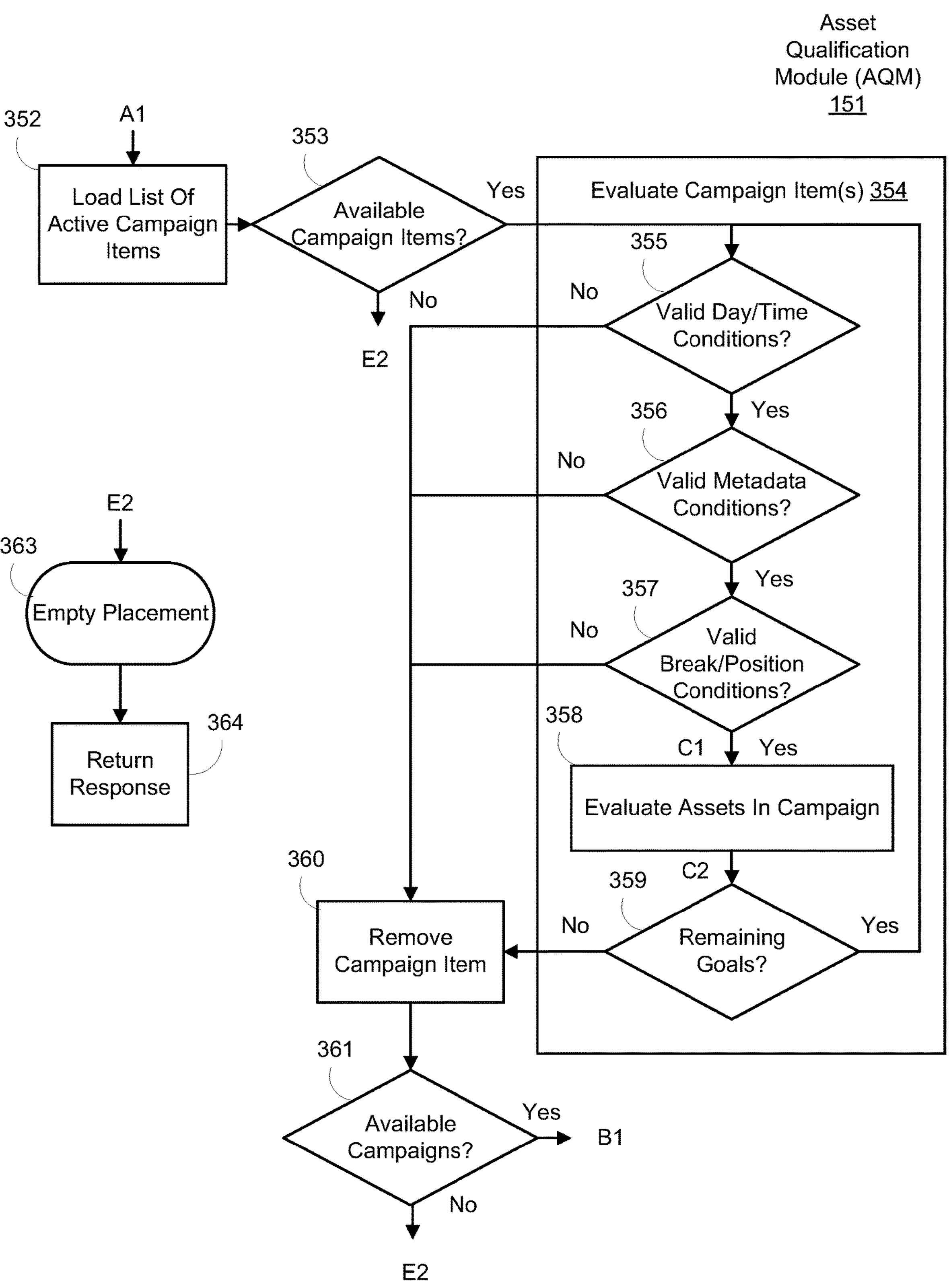
Figure 8:
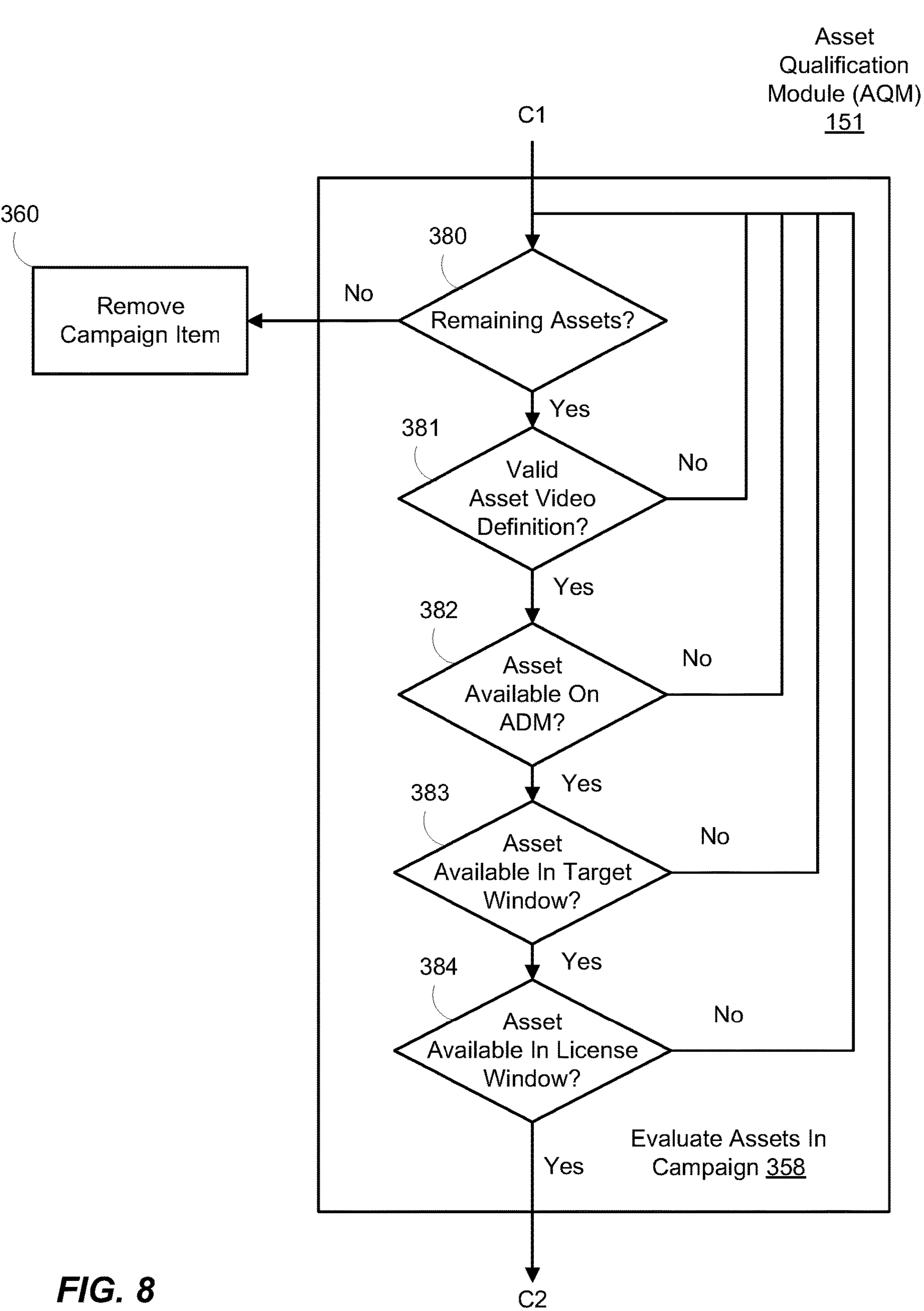

FIGS. 6-8 are exemplary flowcharts of an AQM 151 within an ADS 20. FIG. 6 illustrates the initial reception of a placement request and the validation process of the selected content, the CPE 107, and the content distributor 11. FIG. 7 also illustrates the validation process of placement opportunities of assets within the selected content and the qualification process of campaigns to determine whether assets of those campaigns can be placed within the selected content. FIG. 8 represents the evaluation process of individual assets within the campaigns.

Returning to FIG. 6, the AQM 151 receives a placement request, in the process element 301. The placement request originates from the content distributor 11 and directs the ADS 20 to begin identifying assets for placement into a particular content selected by the CPE 107. The placement request includes information such as the date, time, and rating of the content selected as well as the address of the CPE 107 selecting the content (e.g., physical address, MAC address, etc.). The AQM 151 upon receiving the placement request makes a series of decisions which ultimately results in asset placements for the selected content. Failure in the initial decisions results in an error, E1, that precludes placement of an asset, in the process element 316. If the error occurs, the AQM 151 provides a response to the content distributor 11 generating the placement request, in the process element 317.

Otherwise, the AQM 151 determines whether the placement request is properly formatted, in the process element 302. For example, messaging formats among content distributors 11 are varied. As part of a means for simplifying the communication for asset placement, the ADS 20 may standardize the format of placement requests from content distributors 11. In one embodiment, the interface 154 of the ADS 20 receives messages from the intelligent routing fabric 10 and formats them into placement requests such that content distributors 11 who are not affiliated with the ADS 20 may be rejected according to improperly formatted placement requests. In other words, the formatting of the placement request may act as a form of security to prevent unauthorized content distributors 11 from seeking access to the ADS 20. The AQM 151 then determines whether the message ID and version are valid, in the process element 303. For example, as another security feature, the ADS 20 may assign message identifiers to each authorized content distributor 11 with version numbers to ensure that unauthorized content distributors 11 do not access the ADS 20 be the intelligent routing fabric 10. The version numbers may be useful in assuring that authorized content distributors 11 accounts are up to date. That is, even though a content provider may be authorized to access the ADS 20, they may not be able to request placement of assets in their content because they have been temporarily restricted (e.g., due to failures of payment, assets being deemed inappropriate, etc.).

Once the AQM 151 validates the message ID and version of the placement request, the AQM 151 validates the client and target within the placement request. For example, information regarding the CPE 107 may indicate whether the CPE 107 is authorized to receive content. Based on this information, the AQM 151 may validate the CPE 107 and verify that the target of the selected content is indeed that CPE 107. After doing so, the AQM 151 may identify the local date and time of the CPE 107 (e.g., to identify when assets may run in the selected content). The AQM 151 then validates the terminal address of the CPE 107. To illustrate, a stolen CPE 107 may appear as an authorized CPE 107. However, since that stolen CPE 107 has changed locations, the terminal address of that CPE 107 has also changed due to its connection to a new cable link. Accordingly, the AQM 151 verifies that the CPE 107 is indeed located where it is supposed to be located. Alternatively, this functionality may be configured within the content distributor 11.

Afterwards, the AQM 151 identifies an originating Asset Decision Manager (ADM) and Content Information Service (CIS) of the content distributor 11 and then determines whether the ADM is valid, in the process elements 307 and 308. For example, SCTE standard 104 (SCTE-104) defines an interface between automation systems and compression systems that encode a digital video stream (e.g., an MPEG stream of content) at the content distributor 11. Using SCTE-104, the automation system provides instructions and metadata from which a compression system creates SCTE standard 35 messages as private data packets in the digital video stream. SCTE standard 130 (SCTE-130) defines an architecture for communication and interoperation among various systems employed in cable television advertising. The standard may also include a CIS that defines services for subscriber information and placement opportunities within content to support inventory exchange.

Various vendor systems at the content distributor 11 perform the actual contract management, cue message detections, and asset insertions. SCTE-130 defines the interface that isolates the details of each vendor's system and acts as a front-end through which other systems provide and consume cooperating services. The ADS determines how assets are combined with content. The ADM defines messages in support of asset insertion activities. The primary consumer of these messages is the ADS. The message interfaces exposed by the ADM allow for preconfigured asset decisions and real-time asset fulfillment models. An ADM may incorporate some rudimentary asset selection rules, such as asset rotation, but more complex asset decisions are the responsibility of the ADS. The CIS manages metadata describing the assets, advertising and non-advertising, that are available to the other logical services defined by SCTE-130. The CIS provides query and notification interfaces to these logical services. The query service is available on an ad-hoc basis and may be called by any other logical service at any time without any prior registration. Queries specify values or patterns to be sought in the query message metadata and the specified matching information is returned in a response message.

Once the ADM is identified, the AQM 151 validates the ADM to ensure that it is authorized to access the ADS 20, in the process element 308. After validation, the AQM 151 identifies the asset based on its programmer and asset identifier (the "PAID"), in the process element 309, to determine whether the asset provider is valid and active (process element 310) and whether the asset from that provider is valid (process element 311). For example, the AQM 151 may independently verify the existence of each asset at each operator location. To verify the distribution status of assets, the AQM 151 may employ SCTE-130 part 4 (SCTE-130-4) pertaining to CIS logical interfaces. Thus, the AQM 151 may query each operator CIS endpoint using the unique ID of each asset and the provider's unique programmer ID, or PAID. Alternatively or additionally, the ADS 20 may use VAST signaling depending on its configuration.

In this embodiment, the AQM 151 is initiated to check the status of an asset such as when the interface 154 of the ADS 20 receives the placement request 301. The AQM 151 generates and transfers a request to check the asset status (i.e., the PAID) to a SCTE-130-4 interface of the content distributor 11. The content distributor 11 in turn generates and transfers a content query request to a CIS of the content distributor 11. The CIS then sends a request to retrieve the asset status from back office systems of the content distributor 11. For example, the back-office systems may determine whether the asset is available, unavailable, or its availability is unknown. The status is then returned to the CIS and transferred to the interface in a content query response. The interface informs the AQM 151 of this asset status such that the AQM 151 can determine whether such an asset placement would be valid. If it is not valid, the AQM 151 returns the error response E1 as in other instances and then updates the asset availability. If the asset is valid, its status is also updated such that it may be used for placement in content (i.e., an asset placement timeslot).

With the asset identified and validated, the AQM 151 may then identify placement opportunities within the content selected by the CPE 107, in the process element 312. For example, the content may have certain designated placement opportunities for the assets. The number, or counts, of these timeslots and their durations are used by the AQM 151 to assist in the selection and placement of assets. The AQM 151 may also identify and use any control information associated with timeslots that could restrict certain assets. In identifying these placement opportunities, the AQM 151 validates whether the content selected by the CPE 107 has placement opportunities for the assets and what that number is, in the process element 313. If so, the AQM 151 validates whether the placement opportunities are of the appropriate type, in the process element 314. As mentioned, placement opportunities may include control information or metadata that restricts certain assets from being placed within a selected content. For example, age control information of selected content may be used to restrict certain assets from being placed within that content based on age (e.g., children's shows having control information that restricts assets with more mature content and vice versa). If the opportunity times within the content are valid, the AQM 151 determines whether any placement opportunities are still available within the content selected by the CPE 107, in the process element 315.

After the validation process is complete, the AQM 151 qualifies campaigns to determine whether assets of those campaigns can be placed within the selected content, as illustrated in FIG. 7. In doing so, the AQM 151 retrieves and loads a list of active campaign items, in the process element 352. For example, the AQM 151 may contact the content distributor 11 via the SCTE-130-4 messaging above to access the active campaigns to determine asset campaigns that are active at the content distributor 11. Once the list of active campaigns has been retrieved, the AQM 151 determines whether there are any campaign items that are available. If not, the AQM 151 generates an empty placement, in the process element 363, and a response to the content distributor 11 originating the placement request 301, in the process element 364. For example, if no campaign items are available for asset placement but placement opportunities actually exist within the content selected by the CPE 107, the AQM 151 leaves the placement opportunities open for the content distributor 11 to insert assets within the selected content as desired. In some instances, the AQM 151 may even recommend placement of a noncommercial asset, such as an asset advertising the regular date and time for viewing content from a network (e.g., advertising relating to television programming for a particular TV show).

If campaign items are available for asset placement within the placement opportunities of the content selected by the CPE 107, the AQM 151 evaluates the campaign items in the process element 354. In doing so, the AQM 151 validates the day/time conditions of a campaign item in the process element 355 to ensure that a particular asset in the campaign item is appropriate for the date and time when the content is selected by the CPE 107. For example, a commercial for a mature audience may not be appropriate for viewing until later evening hours when children are not present. Thus, if the content is selected during the afternoon, the AQM 151 may exclude the campaign item containing the mature audience commercial from placement within the selected content. Similarly, if the commercial is intended for children, the information within the campaign item asset may not be relevant to a more mature audience. Thus, if the content is selected during the late evening when children are not present, the AQM 151 may exclude the campaign item from placement within that selected content. So, when the campaign item does not meet the valid date/time conditions, the AQM 151 removes the campaign item from potential insertion into the selected content, in the process element 360. The AQM 151 then determines whether there are any available campaigns remaining from the loaded list of active campaign items, in the process element 361. If there are no available campaigns, the AQM 151 generates an empty placement, in the process element 363 (E2), as described above, and responds to the content distributor 11, in the process element 364. For example, once the AQM 151 evaluates all of the campaign items and excludes all of those campaign items in the process element 354, the AQM 151 then determines if there are any campaigns left for potential placement in the selected content. If there are none, the AQM 151 may generate an empty response and contact the content distributor 11 such that the content distributor 11 may place an asset in the selected content as desires or leave it empty. Otherwise, the AQM 151 transfers the information pertaining to the remaining campaigns, items, and assets to the ARM 152 (B1).

In continuing the evaluation of campaign items, in the process element 354, the AQM 151 validates the metadata conditions of a campaign item, in the process element 356. For example, assets generally have metadata associated with them that describe certain features of the asset, such as a particular actor in the asset, the theme of the asset, targeted audience for the asset, maturity level of the asset, etc. In one embodiment, these metadata features are contained in an EIDR identifier as discussed above. If the assets of the campaign item being evaluated do not meet the desired metadata conditions for the selected content, that campaign item is removed from consideration, in the process element 360. To illustrate, the actor Alec Baldwin has been seen in several Capital One credit card commercials. A campaign item by the Capital One credit card company may wish to have those commercials inserted into the certain content featuring Alec Baldwin as an actor, such as the television show, 30 Rock. Thus, if the selected content does not include Alec Baldwin, that campaign item may be excluded from potential insertion into the selected content. Alternatively or additionally, if the content requires assets of a certain type, the metadata of the assets may be used to exclude the assets from the content. For example, if the content precludes mature content, campaign items having assets with mature themes may be excluded from the selected content based on the metadata of the assets relating to maturity level.

The AQM 151 is also operable to validate break/position conditions of the content selected by the CPE 107, in the process element 357. For example, if the selected content has only 30 second pre roll and post roll timeslots available for asset insertions and the campaign item mandates that the asset be placed at the mid roll timeslot in a content, then the campaign item is excluded and removed in the process element 360.

Once the various conditions for the campaign items have been validated, the AQM 151 then evaluates the individual assets in a particular campaign, in the process element 358. From there, the AQM 151 determines if there are any remaining goals of a particular campaign. If so, the AQM 151 returns to evaluate the remaining campaign items in the campaign (e.g., via process elements 355-358). For example, a campaign may include a campaign item that desires 1000 views of an asset within a certain time period (e.g., a week). Once the asset has been inserted into content 1000 times within that time period, the goal has been reached and the campaign item and/or the asset may be excluded from insertion to the presently selected content and thus removed from consideration, in the process element 360. In other words, once a goal for a campaign item has been met, it may provide little or no value to the content provider and/or the content distributor 11. Accordingly, the AQM 151 may exclude the campaign item from consideration so that other more valuable campaign items may be selected. Examples of campaign goals include campaign duration (e.g., % completion thereof), total number of desired placements, and the like. Otherwise, the AQM 151 adds the campaign item to a list of remaining available campaign items in the process element 362 and continues determining the availability of campaign items, in the process element 353 (B2), to evaluate the campaign items for possible insertion to the selected content.

FIG. 8 is an exemplary flowchart illustrating how the AQM 151 evaluates individual assets of a campaign item in the process element 358 (C1). The AQM 151 initiates this process by determining whether there are any remaining assets within a particular campaign item. As mentioned, individual campaign items may include multiple assets. Thus, if one asset of a campaign item being evaluated is excluded from insertion, another asset of that same campaign item still may be used. If no assets remain for insertion, the campaign item is removed from consideration, in the process element 360. To illustrate, a selected content may be high-definition (HD) format. Accordingly, the AQM 151 may validate the video definition of the asset, in the process element 381, to determine whether the asset is formatted in HD. If not, the AQM 151 returns to determine whether there are any assets remaining in the campaign item, in the process element 380. If there are no other assets remaining, then the campaign item is removed in the process element 360.

The AQM 151 is also operable to determine whether an asset is available on the ADM, in the process element 382. These assets are periodically updated as advertisers wish to update their various campaigns with newer assets. Older assets may be removed from the databases making them unavailable for insertion. Thus, even if the older asset exists in the campaign item, that asset is not available for insertion because it does not physically exist. Accordingly, the AQM 151 removes the asset from consideration and returns to evaluating the remaining assets of the campaign item.

The AQM 151 may also be operable to determine whether an asset is available in a target window, in the process element 383. For example, if the asset is only available during a certain time of the day, day of the week, etc., and the content is selected by the CPE 107 outside of that time window, then the AQM 151 removes that asset from consideration. The AQM 151 may also be operable to determine whether an asset is available in a license window, in the process element 384. For example, the ADM may determine if assets are available for insertion into content. However, that asset could include certain licensing information that precludes insertion into content by the content distributor 11 for any of a variety of reasons (e.g., contractual obligations between television provider and network provider have ceased). Thus, the asset may be excluded from insertion into selected content based on its license window. Once the AQM 151 completes evaluation of the assets within a particular campaign item, the AQM 151 returns to continue evaluating the individual campaign items (C2).

Figure 9:
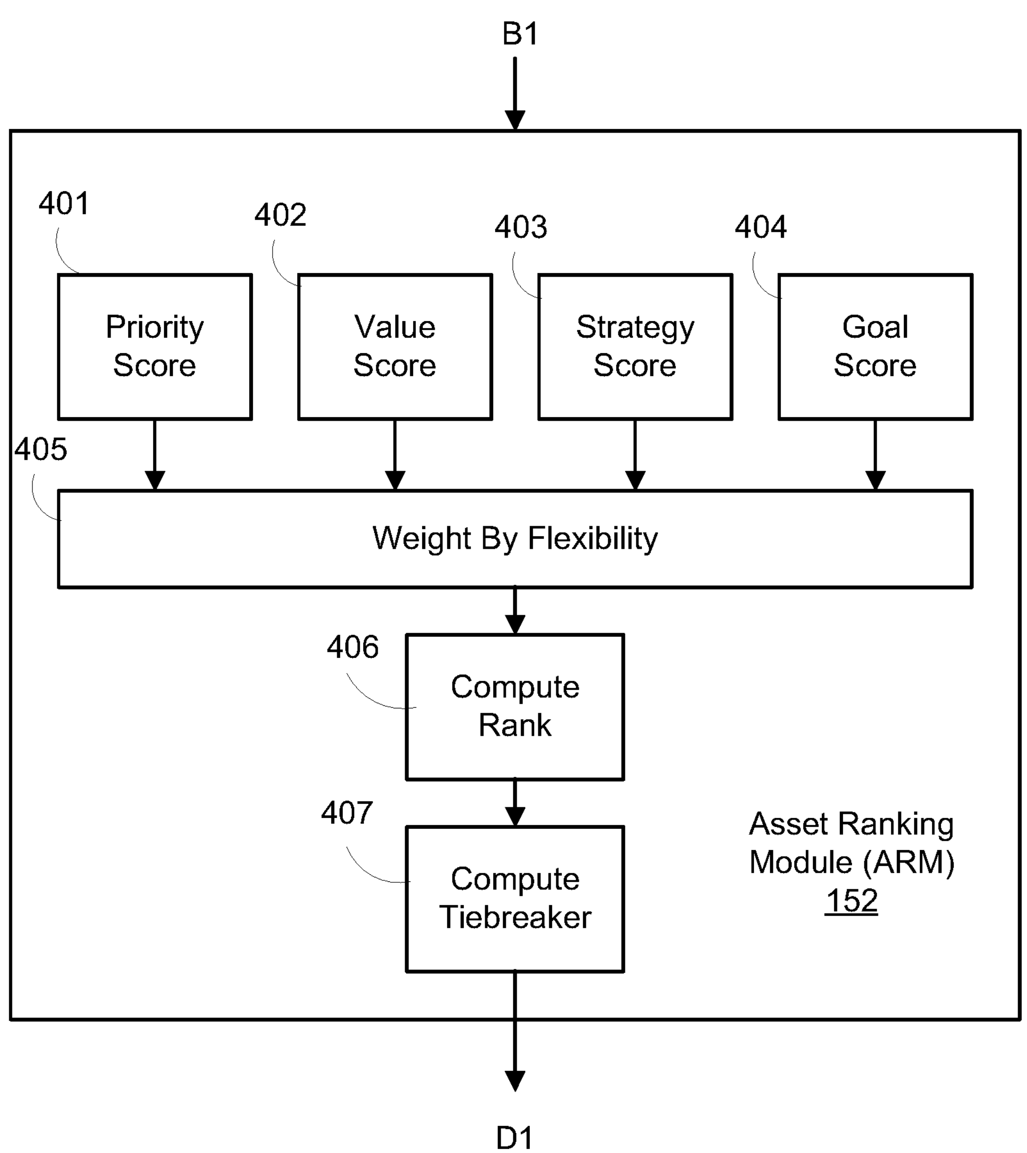
FIG. 9 is a block diagram of an exemplary Asset Ranking Module (ARM) within an ADS.

FIG. 9 is a block diagram of an exemplary Asset Ranking Module (ARM) 152 within the ADS 20. The ARM 152 receives information regarding the campaign assets that are available for insertion into the content provided by content distributor 11. In this embodiment, the ARM 152 includes a priority score module 401, a value score module 402, a strategy score module 403, and a goal score module 404. The ARM 152 also includes a weight by flexibility module 405. Generally, the ARM 152 calculates a total score for each item in a campaign based on a priority score, a value score, a strategy score, a health score, and a flexibility score, etc. For example, the ARM 152 may calculate a total score for each of the campaign items based on the function of: (priority score+value score+strategy score+health score)/flexibility score. The particulars of how each of these scores may be calculated by the ARM 152 are discussed in greater detail below.

The priority score module 401 is any device or system operable to generate priority information for the campaign items provided to the ARM 152 by the AQM 151. A priority score relates to a weighted representation of how important a campaign item is in relation to other items in a campaign. The priority score module 401 may calculate a priority score for each of the campaign items in a campaign based on the function of: (campaign priority value/sum of all priority values for the campaign items)*(parameter weight/100). For the function, the campaign priority value is assigned by the manager that creates the campaign. The parameter weight is a value used to modify how much the priority score figures into the total score.

The value score module 402 is any device or system operable to generate value score information for the campaign items provided to the ARM 152 by the AQM 151. A value score for a campaign item relates to a weighted representation of the income generated by inserting a particular campaign item into content. The value score module 402 may calculate a value score for each of the campaign items in a campaign based on the function of: ((campaign item value)/(the sum of all values for the campaign items in the campaign))*(parameter weight/100). For the function, the campaign item value is the currency value that is assigned for the campaign item. The currency value may be paid upon the campaign item being inserted into the content and/or the campaign item being viewed by a customer (i.e., a user of the CPE 107). The parameter weight is a value used to modify how much the value score figures into the total score.

The strategy score module 403 is any device or system operable to generate strategy scoring information for the campaign items provided to the ARM 152 by the AQM 151. A strategy score for a campaign item relates to a weighted representation of how the campaign item is distributed during an active campaign. Some examples of how the campaign item may be distributed include an even distribution, an "as soon as possible (ASAP)" distribution, etc. The strategy score module 403 may calculate a strategy score for each of the campaign items in a campaign based on the function of: ((campaign item strategy value)/(the sum of all campaign items strategy values for the campaign items in the campaign))*(parameter weight/100). For the function, the campaign item strategy value may be "0" for an even distribution and "1" for an ASAP distribution. Other strategies may exist as any values in between. The parameter weight is a value used to modify how much the strategy score figures into the total score.

The goal score module 404 is any device or system operable to generate goal information for the campaign items provided to the ARM 152 by the AQM 151. A goal score for a campaign item relates to a weighted representation of whether the campaign item is behind schedule, on schedule, or ahead of schedule to meet its goal. The goal score module 404 may calculate a goal score for each of the campaign items based on the function of: ((campaign item health score)/(the sum of all of the campaign item goal values for each of the campaign items in the campaign))*(parameter weight/100). The parameter weight is a value used to modify how much the goal score figures into the total score. The campaign item health score may be determined by the function of: ((% of goal remaining)/(% of time remaining in the campaign)). The "% of goal remaining" may be determined by the function of: ((the campaign item goal−current count))/(campaign item goal). The current count is based on the insertions or views of the campaign item. The "% of time remaining" may be determined by the function of: (hours remaining for the campaign item/total hours for the campaign item), where the hours remaining is a time from the current time through the end of the flight window for the campaign item (e.g., a period of time when the asset is to air). The total hours in the function is the number of hours for the duration of the flight window of the campaign item from beginning to end. Some examples of a goal score are >1 when the campaign is running behind schedule and <1 when the campaign is running ahead of schedule.

The scoring information calculated by modules 401-404 is provided to the weight by flexibility module 405. The weight by the flexibility module 405 is any device or system that is operable to generate flexibility information for the campaign items. The flexibility for a campaign item relates to a representation of how much flexibility exists for a campaign item for placement into the content. For example, a highly flexible campaign item may have little or no restrictions as to what times and/or where the campaign item is placed within the content. In contrast, a campaign item with little or no flexibility may be restricted to a few hours per day or to a few days per week. The weight by the flexibility module 405 may calculate a flexibility score for each of the campaign items based on the function of: (number of days/7)*(average hours/24)*(average number of breaks/program break default)*(average number of positions/program position default). In this function, the number of days is the count of unique days of the week the campaign item is eligible for. For example, if a campaign item is eligible to run Monday, Wednesday, and Friday, then the number of unique days is 3. The average hours may be based on the function of: (the sum of the durations of the campaign item/the count item time instances). The "program break default" in the function is a value assigned by a campaign manager that indicates the standard count of breaks in a session. The average number of breaks may be calculated based on the function of: (the sum of eligible breaks for all positions)/(a count of break positions). The eligible breaks are determined for each position as follows. When the break position is pre-roll or post-roll, the break count is 1. When the break position for the campaign item is "any," then the break count is "program break default." When the break position is mid-roll and the mid-roll by number is "null," then the break count is the ("program break default"–2). When the break position is mid-roll and the number is not null, then the break count is 1. The "program position default" in the function is a value assigned by the campaign programmer that indicates the typical or standard count of positions in a break. The average number of positions may be calculated based on the function of: (the sum of eligible positions for all breaks)/(the count of breaks), where the eligible breaks are determined for each break criteria as follows. When the position is first or last, then the break count is 1 for the break criteria. When the position is "any," then the break count is "program position default" for the break criteria.

After weight by the flexibility module 405 calculates a flexibility score for each of the campaign items, then the priority score, the value score, the strategy score, the goal score, and the flexibility score are provided to a compute rank module 406. The compute rank module 406 is any device or system operable to generate ranking information for the campaign items. The compute ranking module 406 generates a ranking for each of the campaign items based on the function of: ((priority score+value score+strategy score+goal score)/flexibility score). In some cases, one or more campaign items may have a tie ranking. A compute tiebreaker module 407 may utilize a number of other criteria for determining ranking in cases where campaign items are tied. Some examples of the criteria used by the compute tiebreaker module 407 include random assignment (e.g., "coin toss" algorithm), policies regarding preferred campaigns, etc. The ARM 152 then provides the list of campaign items along with their corresponding rankings to the process element 451 of FIG. 9 (D1) to begin conflict resolution between assets.

It should be noted that the various scores and flexibility may be reconfigured as a matter of preference and that the above equations are merely used as exemplary embodiments. For example, an operator of the content distributor 11 may intrinsically value certain asset campaigns over others for any number of reasons. Accordingly, the operator of the content distributor 11 may direct the ADS 20 to "hard wire" the campaign priority value to a particular value. If the preference of the content distributor 11 operator were to change, then the operator may direct the ADS 20 to change the campaign priority value accordingly. This dynamic change capability allows the ARM 152 to provide more flexibility to content distributors 11 on an as needed basis.

Figure 10:
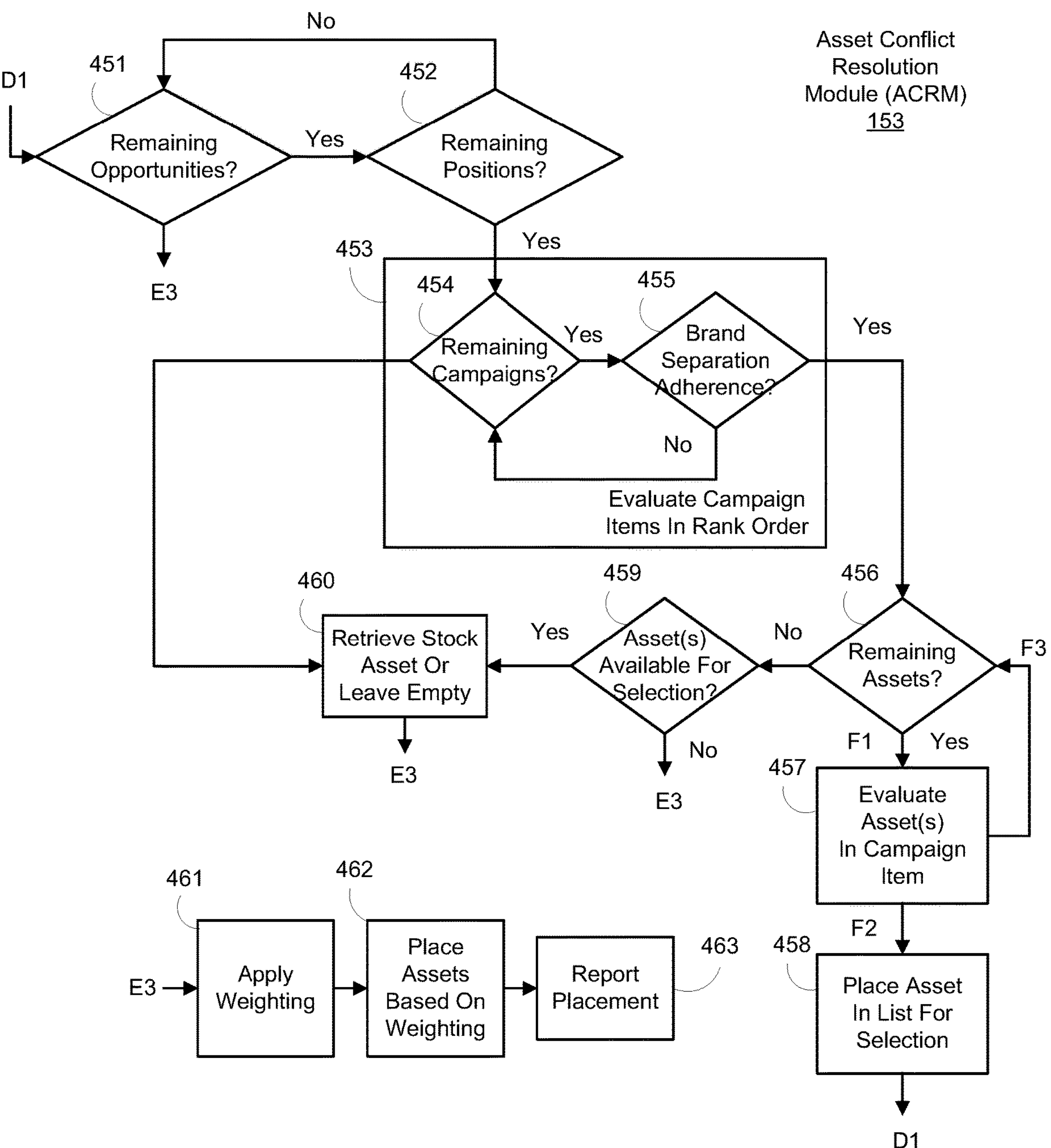
FIGS. 10 and 11 are exemplary flowcharts of an Asset Conflict Resolution Module (ACRM) within an ADS.
Figure 11:
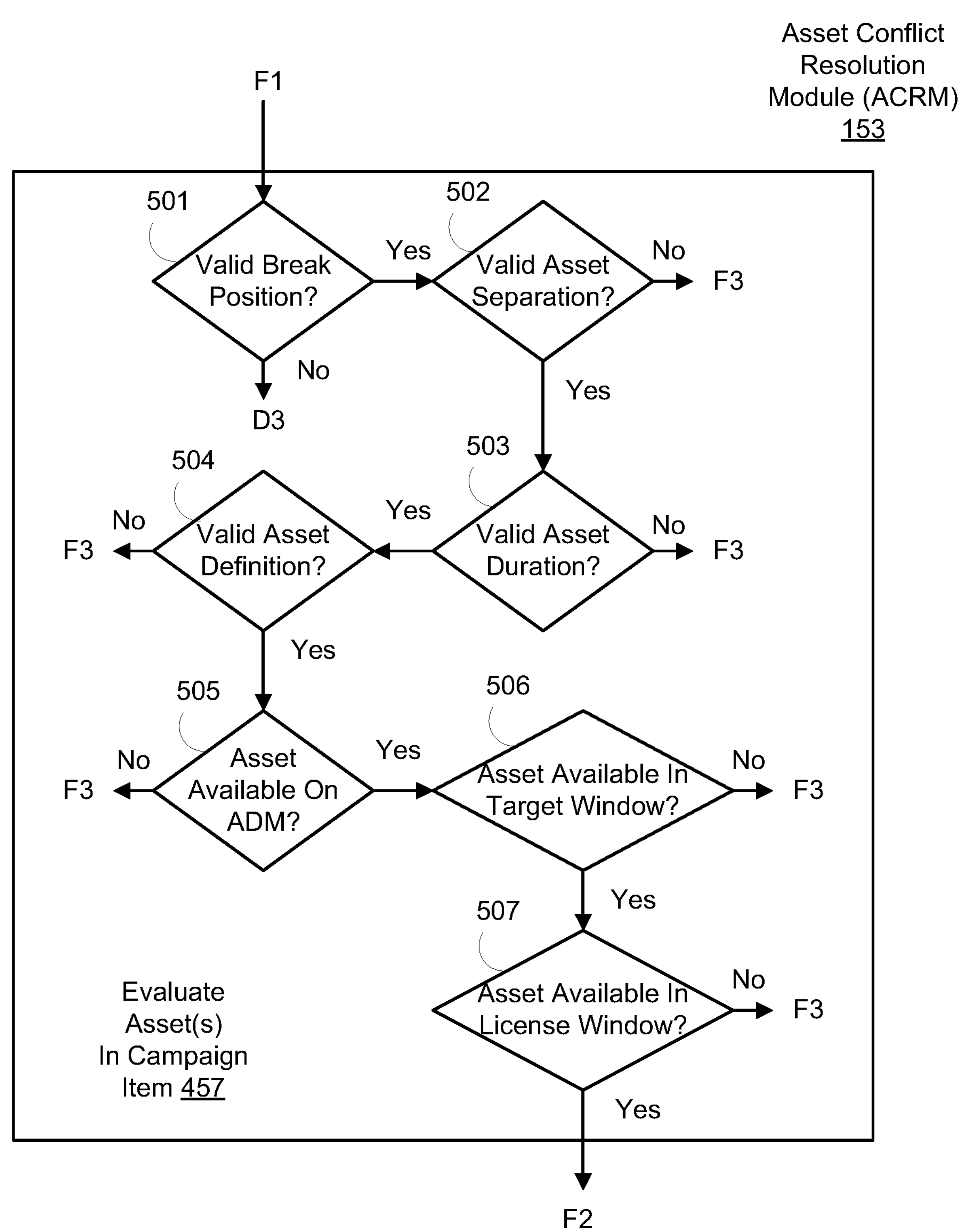

FIGS. 10 and 11 are exemplary flowcharts of the ACRM 153 within the ADS 20. These flowcharts illustrate the process of excluding assets based on conflicts with other assets and campaigns after the campaign items have been ranked by the ARM 152 (i.e., via D1). The ACRM 153 initially determines whether any opportunities remain for placement within the content selected by the CPE 107. In other words, the ACRM 153 determines whether the timeslots of the selected content have been filled with assets. If some timeslots remain open, or unfilled, the ACRM 153 proceeds to identify which timeslot positions remain open and available for asset placement (e.g., pre-roll, mid-roll, post-roll, etc.), in the process element 452. If, however, no opportunities for asset placement remain in the selected content, the ACRM 153 may generate and return a response to the content distributor 11, in the process element 364, indicating that no assets will be placed in the selected content.

When the time slots for asset placement have been identified in the content selected by the CPE 107, the ACRM 153 evaluates the campaign items in rank order (i.e., as ranked by the ARM 152), in the process element 453. The ACRM 153, as an initial part of a loop process through each of the ranked campaign items, determines whether any campaigns remain in the list of ranked campaign items from the ARM 152, in the process element 454. The ACRM 153 then determines whether a particular campaign being evaluated is adhering to brand separation, in the process element 455. For example, some companies prefer that their assets not be placed near assets of a competitor within the same content. To illustrate, the Coca-Cola Company may desire that an asset relating to a Coca-Cola beverage not be placed next to a Pepsi-Cola asset from the Pepsi-Cola Company so as to show individuality of its particular brand. In other words, the brand of the Coca-Cola asset may become diluted when placed next to a Pepsi-Cola asset because the audience may simply equate the two brands as interchangeable cola products. Thus, if a campaign item being evaluated does not adhere to a certain level of brand separation, the ACRM 153 excludes the assets of the campaign item from insertion and searches for another campaign among the ranked list, in the process element 454. If the campaign item does adhere to brand separation, the ACRM 153 starts a loop to evaluate the individual assets in the campaign item, in the process element 457 (F1), by first determining whether any assets remain in the campaign item, in the process element 456. In other words, the ACRM 153 loops through the assets in each campaign item to determine their potential for insertion into the selected content. Once the asset(s) of the campaign item being evaluated has also been evaluated, the asset(s) is placed in a list that directs the selection of the asset(s) for insertion to the selected content. Afterwards, the ACRM 153 returns to the process element 456 to loop through the remaining assets of the campaign item. If no assets remain in the campaign item, the ACRM 153 loops through the evaluation of the individual campaign items in rank order, in the process element 453.

Once all of the campaign items at each campaign have been evaluated and no campaigns remain (i.e., process element 454) or once all of the placement opportunities have been filled, the ACRM 153 directs the content distributor 11 to retrieve the assets based on the list generated, in the process element 458. For example, the list may be included in a report message that is transferred to the content distributor 11 to direct the content distributor 11 to insert the assets into the content selected by the CPE 107. It is possible that all of the assets have been excluded during the processes described herein. Thus, the ACRM 153 may then direct the content distributor 11 to not place any assets in the content selected by the CPE 107.

The ACRM 153 may also direct the content distributor 11 to place assets relating to content, programming, or even services provided by the content provider. For example, if no assets remain, standard programming information, such as time and date, pertaining to the selected content may be configured as an asset and placed in the selected content. To further illustrate, when an episode of "Modern Family" is selected by a CPE 107 and no assets remain for insertion into the available time slots of that episode, the ACRM 153 may direct the content distributor 11 to present the user of the CPE 107 with the date and time when the next episode of Modern Family can be seen. However, the invention is not intended to be limited to any particular type of noncommercial asset.

Since it is also possible that not all of the assets in the list may be placed as there may be more assets than available opportunities, the ACRM 153 may weight the assets prior to placement in the selected content, in the process element 461. For example, certain assets may provide greater value to the content distributor 11 and/or the content provider. In this regard, the ACRM 153 may rank the remaining assets in a manner that provides the most monetary compensation to the content distributor 11/content provider. Thus, the ACRM 153 may reduce the list of available assets for insertion to the number of opportunities, or timeslots, in the selected content to provide this value to the content distributor 11/content provider. In any case, the ACRM 153 directs the content distributor 11 to place the assets in the selected content based on the ranked list, in the process element 462. Once placement has been directed, the ACRM 153 generates a placement report and transfers that report to the content distributor 11 so that the content distributor 11 can track marketing views (e.g., for later negotiations between television providers and marketers). For example, when a marketer can know how many views of a particular asset there were in a selected content, the marketer can assign a value to that asset that may be used in negotiating price for additional views of the asset in future selected content.

In FIG. 10, the ACRM 153 loops through the assets in each campaign item to determine their potential for insertion into the selected content (F1). During the evaluation of a particular asset, if the asset fails to qualify for insertion into the selected content, the ACRM 153 may return to the process element 456 to determine whether there are any other assets remaining for evaluation (F4). Otherwise, the ACRM 153 continues through a variety of evaluation steps. In this embodiment, the ACRM 153 initiates by determining valid break positions within the selected content, in the process element 501. For example, an asset may require insertion into a certain timeslot within the content. If that timeslot is not available for the asset, the asset may be excluded from consideration. The ACRM 153 may also determine whether there is a valid asset separation of a particular asset, in the process element 502. For example, while the brand separation adherence is determined in the process element 455, certain other assets may require separation within content. To provide another real-world example, the Coca-Cola Company may wish to not place an asset pertaining to Coca-Cola products immediately next to one another so as to not bombard the user of the CPE 107 with multiple advertisements at roughly the same time. Accordingly, the ACRM 153 may ensure that the assets of a particular company, product, etc. are separated within the selected content.

The ACRM 153 may also determine whether a particular asset is of the proper duration, in the process element 503. For example, some timeslots within content are only available in 30 second "chunks". Thus, if the asset under evaluation is only 15 seconds, there would be a period of 15 seconds of unoccupied airtime in the content. The ACRM 153, in this regard, may then exclude that asset from insertion into the selected content. Alternatively, the ACRM 153 may search for another 15 second asset within the potential assets for insertion alongside the 15 second asset to fully occupy the placement opportunity and prevent missing a placement opportunity in the content. The ACRM 153 may also determine whether the asset is the correct video definition for insertion into the content, in the process element 504. For example, content may vary in terms of definition from selection to selection. Some content selections may be of a standard definition (SD) format whereas the assets may be in a high definition (HD) format. To ensure that the assets can be placed in the selected content and played at the same format of the SD content selection, the ACRM 153 may exclude those HD formatted assets (and vice versa).

As part of an extension to the exclusion process by the AQM 151, the ACRM 153 may also be configured to communicate with the ADM to determine whether the asset is available at the ADM (process element 505), whether the assets is available in the target window (process element 506), and whether the asset is available in the license window (process element 507). The process element 457 ends (F2) with the placement of the asset in the list for selection in the process element 458 of FIG. 10.

Figure 12:
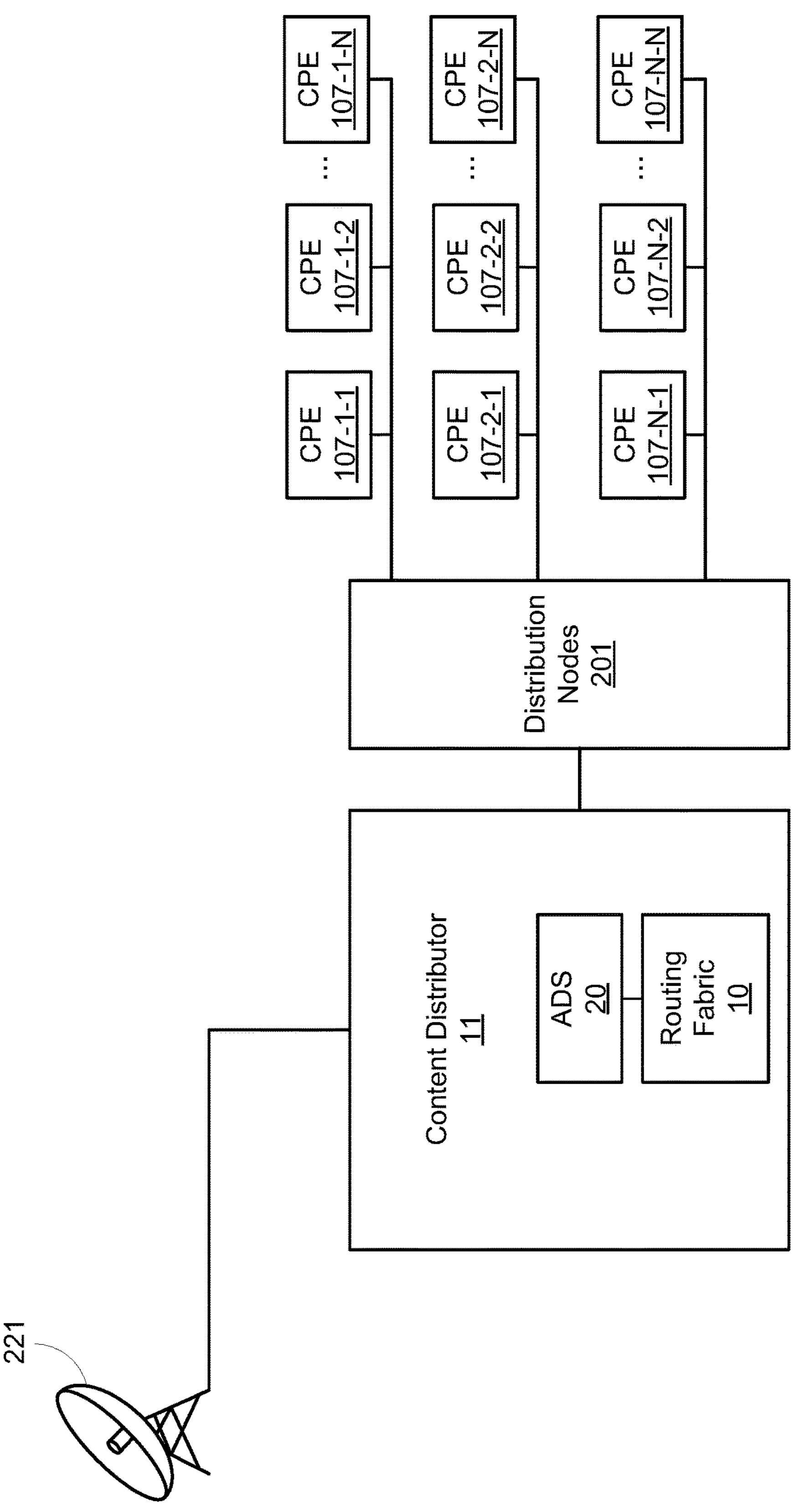
FIGS. 12-14 are block diagrams of an exemplary ADS operable with various content delivery systems.

FIG. 12 is a block diagram of an exemplary ADS 20 and intelligent routing fabric 10 configuration within the content distributor 11 to retrieve assets for insertion into content. For example, the content distributor 11 may receive content from a communication link such as the satellite dish 215. The content distributor 11 may store that content for distribution to various CPE 107*s* when so directed. The content distributor 11 may be communicatively coupled to one or more distribution nodes 201 to distribute content to the CPEs 107.

Content that is available to the CPEs 107 is presented to the CPEs through a programming menu from the content distributor 11. For example, the content distributor 11 provides a signal to the CPEs 107 via the distribution nodes 201 containing information relating to programming, available content, date and time, CPE firmware instructions and updates, etc. The CPE 107 processes the signal and displays much of this information to the user via some type of display module, such as a television or a computer monitor (not shown). In this regard, the user may retrieve a menu of available content and select a desired content. The user's content selection is transferred to the content distributor 11 of the content distributor 11 via the distribution nodes 201. The content distributor 11 then provides the selected content for playback to the CPE 107.

A distribution node 201 is any system or device operable to interface between the content distributor 11 and multiple CPEs 107 for the purposes of communication. For example, the content distributor 11, in general, does not directly link to the CPEs 107. For a traditional cable television MSO, this generally involves a system of feeder cables and drop cables that define a number of system subsections or branches. Signals from the content distributor 11 may be processed by the distribution nodes 201 to insert localized content, filter locally available channels, or otherwise control the content delivered to users in the locale of a particular node. The resulting content within a node's locale is typically distributed by optical and/or coaxial links to the individual CPE 107. Each CPE 107 processes the signal from the content distributor 11 to display the content on the display device.

As shown herein, the distribution nodes 201 are aggregated into a single element for the purposes of illustration. Each distribution node 201 is coupled to a plurality of CPEs 107 to distribute the signals from the content distributor 11 and to process communications from the CPEs 107 to the content distributor 11. For example, a first distribution node 201 may be communicatively coupled to the CPEs 107-1-1-107-1-N, whereas a second distribution node 201 may be communicatively coupled to the CPEs 107-2-1-107-2-N, and so on (where "N" is merely intended to represent an integer greater than 1 and not necessarily equal to any other "N" reference number shown and described herein).

Figure 13:
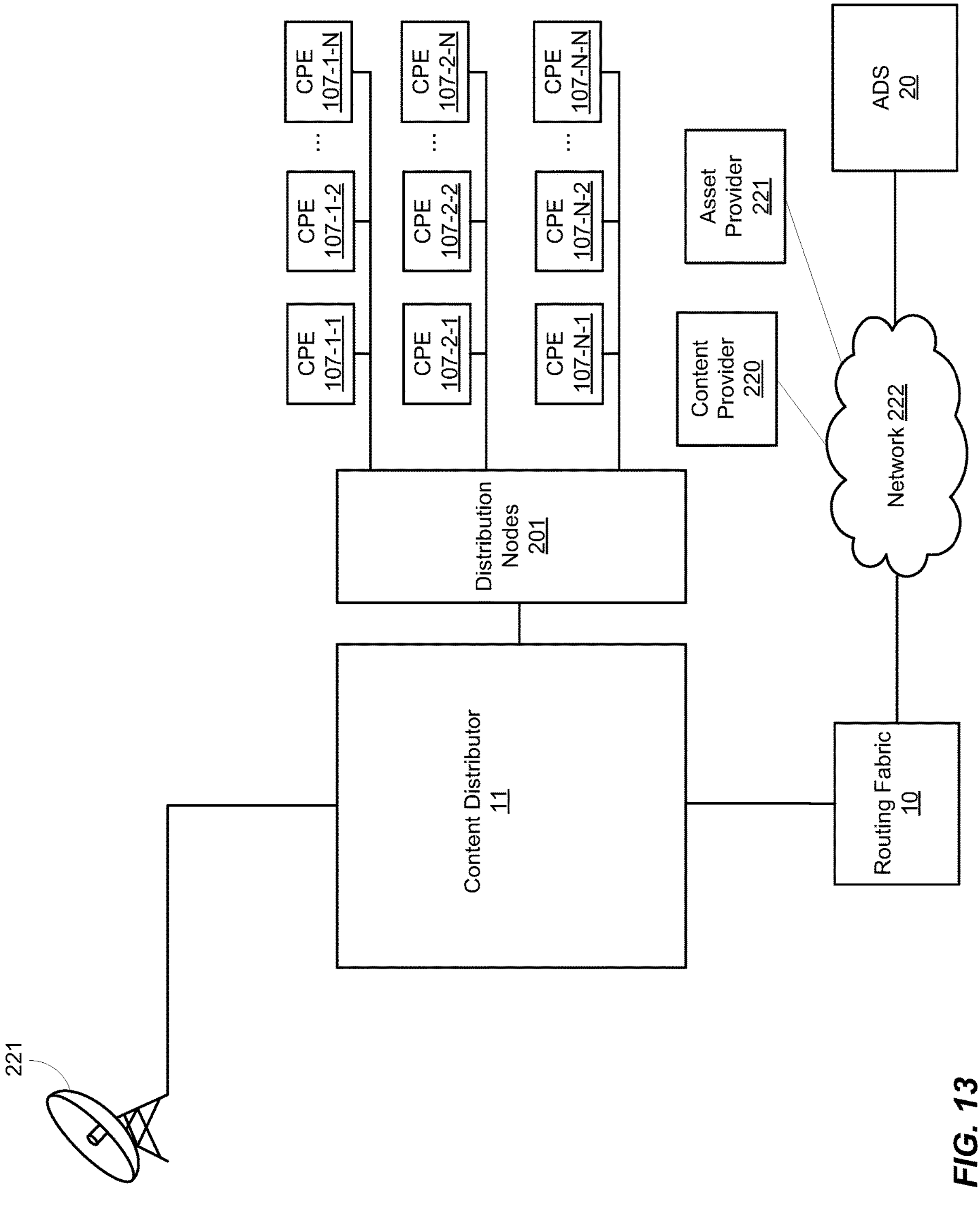

FIG. 13 is a block diagram of an exemplary ADS 20 and intelligent routing fabric 10 configuration operable with a content distributor 11 through a network 222. In this embodiment, the ADS 20 and the intelligent routing fabric 10 are separate from the content distributor 11 and communicate therewith via a network 222. For example, the ADS 20 may be a remotely configured system that interacts with the content distributor 11. In this regard, the ADS 20 may be operable to interface directly with content providers 220 and/or asset providers 221 to receive information through the network 222 regarding certain asset campaigns of the asset providers 221. For example, the content providers 220 and the asset providers 221 may negotiate to place certain assets within content from the content providers 220. Information pertaining to these negotiated asset campaigns may be conveyed to the ADS 20 via the network 222. The ADS 20 may then use this information and direct the content distributor 11, via the intelligent routing fabric 10, to insert the assets of those campaigns into the content selected by the CPEs 107.

The network 222 may be any type of communication link capable of providing communication between the ADS 20 and the intelligent routing fabric 10 and the content distributor 11. For example, the network 222 may be the Internet, an Intranet, or some other type of data network. Alternatively, the network 222 may be an analog network operable to communicate content, such as analog television networks and analog radio networks. The network 222 may also be implemented as a virtual private network via the Internet. In any case, the ADS 20 and the intelligent routing fabric 10 may communicate through the network 222 using standard cable television protocols such as the SCTE standards and/or VAST standards.

Figure 14:
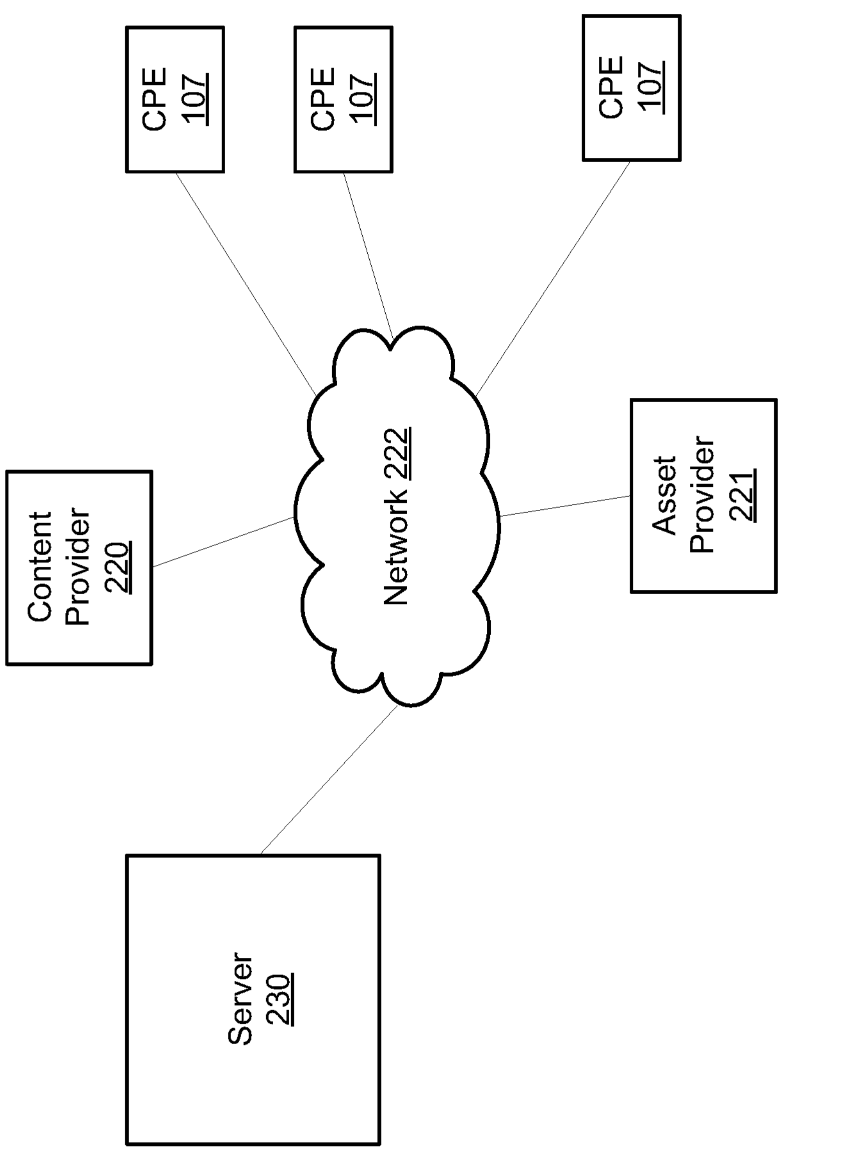

FIG. 14 is a block diagram of an exemplary ADS 20 and intelligent routing fabric 10 configuration operable with a server 230 to deliver content through the network 222. In this embodiment, the server 230 includes the content distributor 11 to deliver content to the CPEs 107 via the network 222. Again, the ADS 20 is operable to direct insertion of assets into the content for presentation to the users of the CPEs 107. In this regard, the server 230 may be configured to receive content from the content provider(s) 220. The server 230 may also receive assets from the asset provider(s) 221 and store that content within a database as appropriate. The invention, however, is not intended to be limited to any particular manner in which the server 230 is intended to receive the content and/or the assets from their various providers.

The CPE 107 may be a computer or a mobile computing device capable of displaying video from the network 222 (e.g., via streaming video over the Internet). For example, a CPE 107 may select a desired content from an Internet website hosted with the server 230 through the network 222. Once selected, the content distributor 11 may retrieve the content for Internet delivery to the selecting CPE 107. The ADS 20, being communicatively coupled to the content distributor 11, processes information pertaining to the content selection and selects assets for insertion into that content. The ADS 20 may do so based in part on the campaigns of the asset providers 221 and in a manner that provides value to the content providers 220.

Figure 15:
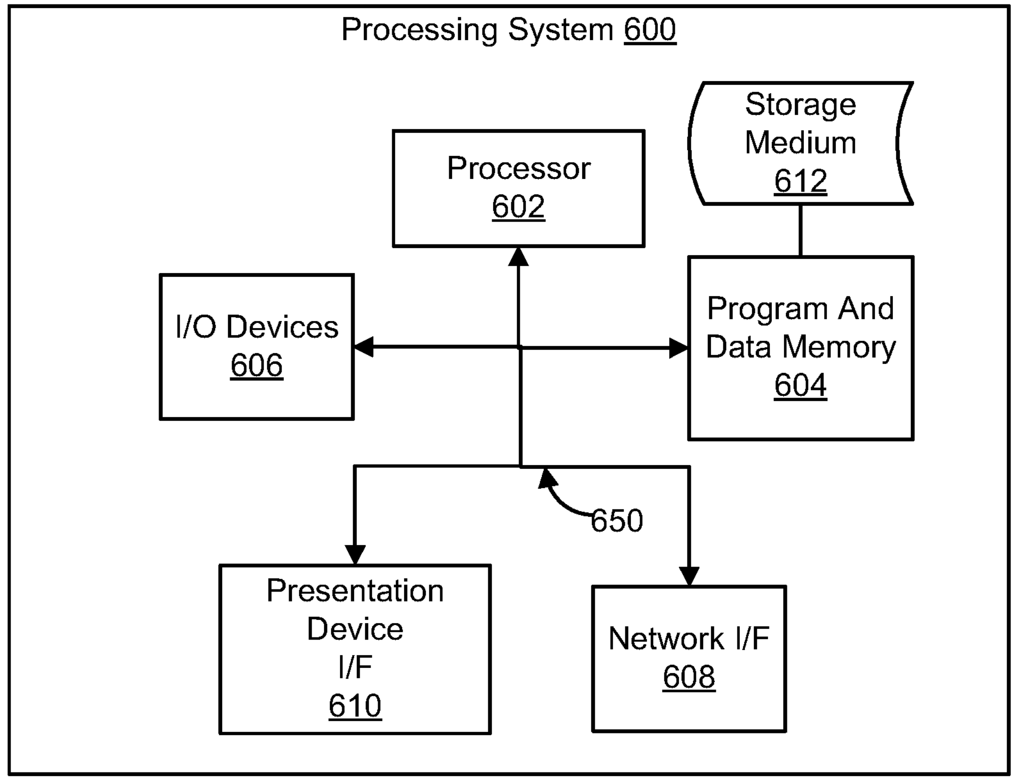
FIG. 15 is a block diagram of an exemplary processing system operable to implement an ADS.

FIG. 15 is a block diagram depicting a processing system 600 also operable to provide the above features by executing programmed instructions and accessing data stored on a computer readable storage medium 612. In this regard, embodiments of the invention can take the form of a computer program accessible via the computer-readable medium 612 four providing program instructions for use by a computer or any other instruction execution system. For the purposes of this description, computer readable storage medium 612 can be anything that can contain, store, communicate, or transport the program instructions for use by a computer.

The computer readable storage medium 612 can be an electronic, magnetic, optical, electromagnetic, infrared, or semiconductor device. Examples of computer readable storage medium 612 include a solid-state memory, a magnetic tape, a removable computer diskette, a random-access memory (RAM), a read-only memory (ROM), a rigid magnetic disk, and an optical disk. Current examples of optical disks include compact disk-read only memory (CD-ROM), compact disk-read/write (CD-R/W), and digital versatile disc (DVD).

The processing system 600, being suitable for storing and/or executing the program instructions, includes at least one processor 602 coupled to memory elements 604 through a system bus 650. Memory elements 604 can include local memory employed during actual execution of the program instructions, bulk storage, and cache memories that provide temporary storage of at least some program e and/or data in order to reduce the number of times the program instructions and/or data are retrieved from bulk storage during execution.

Input/output (I/O) devices 606 (including but not limited to keyboards, displays, pointing devices, etc.) can be coupled to the processing system 600 either directly or through intervening I/O controllers. Network adapter interfaces 608 may also be coupled to the system to enable the processing system 600 to become coupled to other processing systems or storage devices through intervening private or public networks. Modems, cable modems, IBM Channel attachments, SCSI, Fibre Channel, and Ethernet cards are just a few of the currently available types of network or host interface adapters. A presentation device interface 610 may be coupled to the system to interface to one or more presentation devices, such as printing systems and displays for presentation of presentation data generated by the processor 602.

Figure 16:
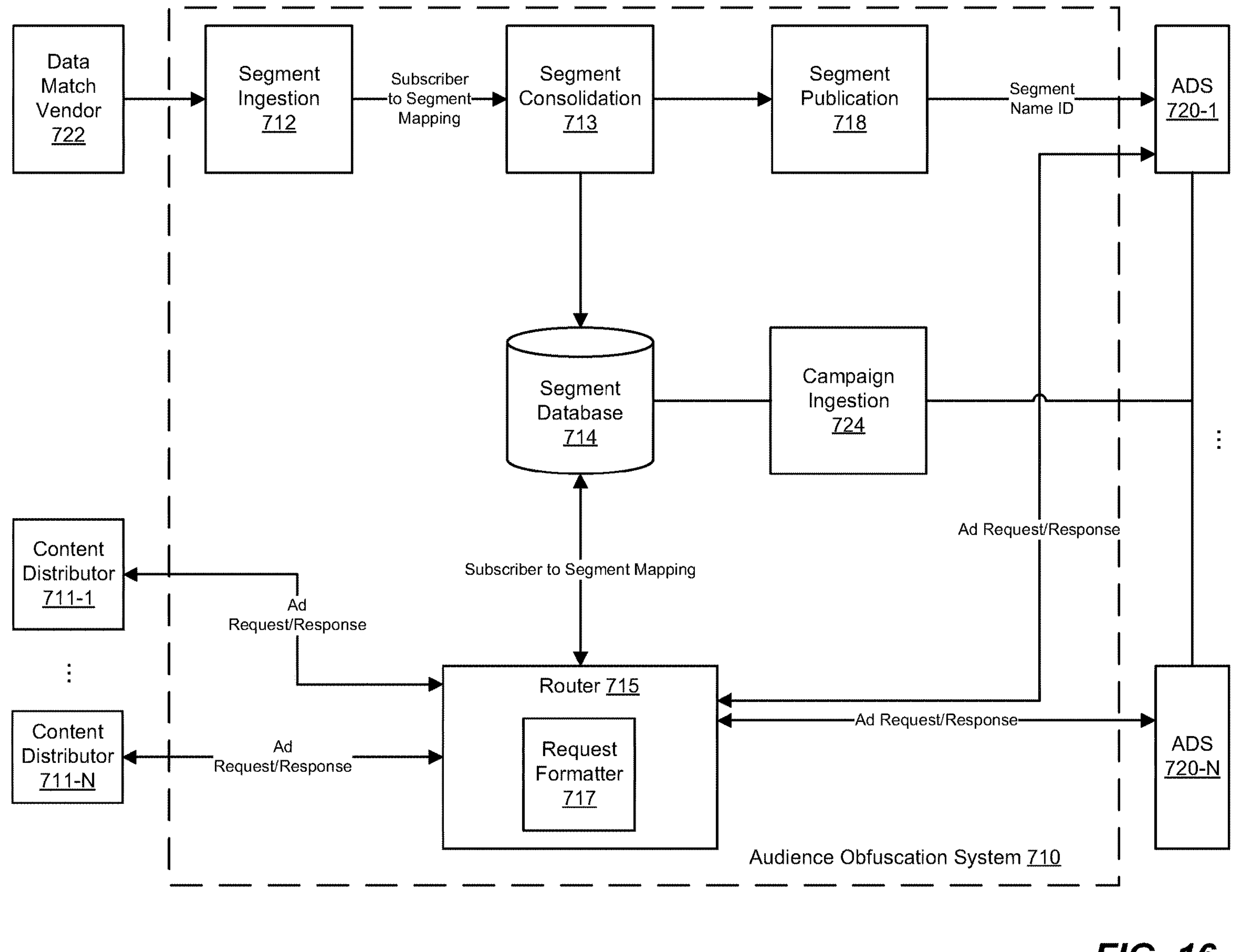
FIG. 16 is a block diagram of an exemplary audience obfuscation system.

FIG. 16 is a block diagram of an exemplary audience obfuscation system 710. Generally, the audience obfuscation system 710 is configured with a network element, such as a server or other computing system, to communicate through a network with a plurality of content distributors 711-1-711-N (where the reference "N" is an integer greater than "1" and not necessarily equal to any other "N" reference herein) and a plurality of advertisement decisioning systems (ADSs) 720-1-720-N. In this embodiment, the audience obfuscation system 710 is operable to receive and process requests from the content distributors 711-1-711-N for assets to be inserted into the respective contents being requested by subscribers to the content distributors 711. The audience obfuscation system 710 may transfer those requests to the ADSs 720-1-720-N to receive assets (e.g., advertisements and other "creatives") for insertion into the content being provided to the subscribers. That is, the content distributors 711 send requests to the audience obfuscation system 710 for assets to be inserted into the content being selected by their subscribers, and the ADSs 720 determine assets for those insertion opportunities. The ADSs 720 then deliver the assets to the content distributors 711 via the audience obfuscation system 710. In this regard, the audience obfuscation system 710 is any system, device, software, or combination thereof operable to handle the routing of advertisements and requests between the content distributors 711 and the ADSs 720.

In some instances, the audience obfuscation system 710 also obscures Personally Identifiable Information (PII) of the subscribers, such as household identifications (HHIDs) and/or device identifications (MACIDs), from some of the ADSs 720. Although, other PII that the router 715 could receive and obscure may include IP Addresses, phone numbers, set top box IDs, media access control address or "MAC" address, addresses, names, recent purchases, or the like. For example, the content distributors 711 have access to the HHIDs and this information is included in the requests to the audience obfuscation system 710. Some of the ADSs 720 are permitted access to this information, however, others are not. In the instances where an ADS 720 is owned and/or operated by a particular content distributor 711, that ADS 720 may be permitted access to the PII of a subscriber to that content distributor 711. But, in the instances where the ADS 720 is not owned or operated by a particular content distributor 711, the ADS 720 may not be permitted access to the PII. Thus, when the ADS 720 is not permitted access to the PII of the subscriber to the content distributor 711, the audience obfuscation system 710 strips the PII from the requests before transferring the requests to those ADSs 720.

In some embodiments, the requests from the content distributors 711 are Society of Cable Telecommunications Engineers (SCTE) 130-3 requests. And, in some embodiments, the interfaces to the ADSs 720 comprise Video Ad Serving Template (VAST) interfaces. So, the audience obfuscation system 710 may translate the SCTE 130-3 requests into VAST requests. In this regard, the audience obfuscation system 710 may include a router 715 that is operable to translate the SCTE 130-3 requests into VAST requests and then route the VAST request to the appropriate ADSs 720. However, other communication standards may be employed. So, the audience obfuscation system 710 may be operable to coordinate requests for assets from virtually any type of content distributor 711 using any type of communication standard to virtually any type of ADS 720. Some non-limiting examples of other content distributors 711 include linear content distributors (e.g., broadcast television), streaming video system, streaming music and other audio systems, and websites.

Before routing the requests to the ADSs 720, the router 715 may format the requests with a request formatter 717. The request formatter 717 may strip the PII from the request and replace it with zero to many audience segment identifiers. For example, based on the PII of a request, the request formatter 717 may identify a list of audience segments targeted to the content provider's active campaigns that a subscriber belongs to, such as males between the ages of 25 and 50 who recently purchased or wish to purchase Ford trucks. In this regard, the request formatter 717 may process a key/value identifying each audience segment that has been distributed from the content provider's data match vendor 722 to the ADS 720.

The data match vendor 722 is generally a trusted third party data storage that retains PII from the content distributors 711 and sale points (e.g., actual subscriber transactions). For example, the data match vendor 722 may receive information regarding certain in-person and/or on-line purchases that a particular subscriber has made in the past. That information and any PII of the subscriber learned during the purchase may be passed to the data match vendor 722 and aligned with a corresponding subscriber of a content distributor 711 based on the PII of the subscriber that the content distributor 711 retains (e.g., for billing purposes, account management, etc.).

When the content provider 711 desires advertisement content ("ad content") for a particular audience segment, the content provider 711 may assign a unifying identifier and a name for that audience segment, and transfer that unifying identifier to the audience obfuscation system 710 through the data match vendor 722 and, in some cases, the content distributor 711. When audience segment metadata passes through the content distributor 711 before being loaded to the ADSs 720, some subscribers who have opted out of addressable advertising may be removed. Then, the audience obfuscation system 710 preserves the PII of subscribers of a content distributor 711 matching that audience identifier, determines if the content provider's ADS 720 can receive the PII, and, if the ADS 720 is not permitted access to the PII of the subscribers, format a message for the ADS 702 that incorporates information of the unifying audience identifier and/or name for the ADS 720 to select addressable ad content for those subscribers when the audience name/identifier is targeted to an active campaign.

This also allows the audience obfuscation system 710 to consolidate audience members (e.g., subscribers to the content distributors 711) across all of the content distributors 711 and obfuscate their PII by forming a unified group of subscribers for content providers and advertisers represented by a single audience identifier and name to be targeted on an upcoming campaign with addressable advertising without providing PII to the ADS 720.

The unifying identifier may be represented in a number of ways that allows the segment identifier to rapidly consolidate audience members into a group and to rapidly access the group when adding and/or subtracting audience members. Such an identifier may also be issued a time stamp such that the group can be deleted when the group is no longer necessary (e.g., when an advertising campaign is no longer employed). Examples of the unifying identifier may include "FordIntenders20210108" pertaining to people who may be interested in purchasing a vehicle from the Ford Motor Company for an advertisement campaign created on Jan. 10, 2021, "HomeDepotCustomers20210110 pertaining to people who are Home Depot customers for an advertisement campaign created on Jan. 10, 2021, etc.

The audience obfuscation system 710 ensures that a single segment identifier and name, using content provider names assigned in the Data Match Vendor, represents subscribers of the content distributors 711. The audience obfuscation system 710 may then store that segment ID and name in the segment database 714, mapped to the full list of subscribers. This data store is pre-filtered to audience segments attached to content provider active campaigns and pre-staged for use of the router 715 during real time transactions that require PII to be removed and replaced with a list of audience segments that contain the subscriber that is watching the content.

To illustrate, the router 715 may receive requests from a content distributor 711. The router 715 may translate some of the requests into the communication standard of the ADSs 720. The request formatter 717 may remove the PII (i.e., the HHID) from some of the translated requests and determine which active audience segments the HHID resides in by looking up active segments linked to that subscriber in the pre-staged database in milliseconds during the time of the transaction. The request formatter 717 may use the HHID and the content provider to lookup active audience segments that the HHID is a member of for that content provider. The request formatter 717 then places that list of segment identifiers or names which define the audience segments in an outbound request to the ADS 720. In other words, when the request formatter 717 receives requests for advertisements from a content distributor 711, the request formatter 717 may assign the applicable audience segments to each request and transfer the requests to the ADS 720 being used by the content provider.

In generating the requests to the ADSs 720, the request formatter 717 may generate uniform resource locators (URLs) to transfer the requests to the ADS 720. These requests may communicate to the ADS 720 that content is being viewed, and that there are available ad opportunities in that content that need to be filled. The requests to the ADS 720 may also include a host of other details about the content session, such as the active segments that a household resides in. The audience obfuscation system 710 may perform this operation for any number of content distributors 711 and/or ADSs 720.

Once the requests are received by an ADS 720, the ADS 720 may transfer advertisements to the audience obfuscation system 710 to fulfill the advertisement requests of the content distributors 711. For example, an ADS 720 may receive a plurality of requests from the router 715 and subsequently fulfill each request with one or more advertisements for insertion into content of the content distributors 711. In doing so, the ADS 720 may determine which advertisements are eligible based on the campaign targeting parameters applied to the campaigns by the content providers. This targeting may include targeting of the audience segment names/identifiers provided to the ADS 720 by the audience obfuscation system 710, therefore making the ad decision addressable by targeting the subscribers of the content distributors 711 (e.g., based on the audience segments).

To illustrate using the Ford truck example, the router 715 may transfer requests for advertisements to an ADS 720 that includes a Ford truck audience segment (e.g., males between the ages of 25 and 50 who recently purchased Ford trucks). Then, the ADS 720 may fulfill those advertisement requests with advertisements for Ford trucks and/or other Ford vehicles that contain that audience segment targeted on the active campaign. The ADS 720 may do so by transferring a Video Multiple Ad Playlist (VMAP) Extensible Markup Language (XML) template to the router 715 as a response, which is translated into an SCTE 130-3 response. The VMAP XML template allows the ADS 720 to describe structure for insertion of advertisement inventory into content. The router 715 may then transfer the response to the content distributor 711 such that the content distributor 711 may retrieve the advertisements from the SCTE 130-3 response and insert them into the content being selected by the content distributor 711's subscribers. However, other communication standards may be employed. So, the audience obfuscation system 710 may be operable to coordinate responses that contain assets from virtually any type of ADS using any type of communication standard to virtually any type of content distributor. Some non-limiting examples of other content distributors 711 include linear content distributors (e.g., broadcast television), streaming video system, streaming music and other audio systems, and websites.

In some embodiments, the audience obfuscation system 710 ingests audience segments from the content provider's data match vendor 722 with a segment ingestion module 712. Segment ingestion generally refers to mapping the list of subscriber IDs from each distributor 711 to an audience segment ID and name. The audience obfuscation system 710 may receive and process audience segment files from content distributors 711 independently. Generally, each segment file includes an audience segment identifier and audience segment name (e.g., Ford truck owners, Coca Cola purchasers, etc.). Both of these identifiers may be linked to a list of subscriber identifiers that have been matched to the audience segment. The segment consolidation module 713 receives mapped data from the segment ingestion module 712 and persists a multi-distributor footprint together under one consolidated segment identifier and name.

In this regard, the audience obfuscation system 710 may link subscriber IDs to segment name data for all segment identifiers and/or names attached to active campaigns. This data may then be utilized by the request formatter 717 during Ad Request Modification in real-time. For example, when the audience obfuscation system 710 receives a request from a content distributor 710 for advertisements, the audience obfuscation system 710 may extract the PII of the request and look up the audience segment(s) to which the subscriber belongs. The audience obfuscation system 710 may then generate a request for the ADSs 720 that fulfills advertisement opportunities in the content and satisfies the audience segment of the subscriber. The audience obfuscation system 710 may also store the content distributor 711's subscriber ID data (e.g., HHID's) and map it to the segment names in the segment database 714 for subsequent rapid retrieval.

When an audience segment is generated, a segment publication module 18 may publish the audience segments to an ADS 720 to be targeted on a campaign such that appropriate advertisement selections can be performed by the ADS 720 when ad requests are received. While the ADS 720-1 is illustrated as receiving the published audience segments, this illustration just shows how an ADS 720 receives audience segments for the purposes of simplicity. Each of the ADSs 720-1-720-N may receive the published audience segments. Similarly, each of the ADSs 720-1-720-N may receive requests and issue appropriate responses with ad content for content insertion.

In some embodiments, the audience obfuscation system 710 also includes a campaign ingestion module 724. The campaign ingestion module 724 is communicatively coupled to the ADS of 720 to receive and process information pertaining to campaigns of various content providers.

The segment ingestion process that collects audience segments from the content provider's data match vendor 722 and delivers obfuscated or non-obfuscated audience segment data to the downstream ADSs 720. For example, when the audience obfuscation system 710 receives a request for advertisements from a content distributor 711, the audience obfuscation system 710 may extract and remove the PII of the request and identify an active audience segment list from the segment database. Then, the audience obfuscation system 10 replaces the PII with the audience segment(s) to assist the ADS 720 in identifying appropriate/relevant addressable advertisements for the content distributor 711.

The segment consolidation and transfer module 713 may publish the consolidated audience segment (e.g., via the segment publication module 718) in the form of a key-value pair through to an ADS 20 being used by the content provider. For example, segment ingestion module 712 may classify the files from the data match vendor 722 into the various audience segments and transfer that information to the segment consolidation and transfer module 713-1 such that the segment consolidation and transfer module 713-1 may publish the consolidated audience segment to the ADS 720-1 being used by the content provider. The ADS 720-1 may then form flotillas of advertisements via advertisement responses for insertions into the content of the content distributor 711-1. This form of audience segmentation may obfuscate the identities of the subscribers of the content distributor 711-1.

Alternatively, when the audience segmentation does not require obfuscation, the segment ingestion module 712 may transfer the subscriber file and audience segment from the data match vendor 722 directly to the ADS 720. For example, the segment ingestion module 712 may still process the subscriber files from the data match vendor 722 and perform the audience segment consolidation the content distributor 711-N. However, in this instance, the segment ingestion module 712 may publish the subscriber files directly to the ADS 720-N along with the audience segments of those files. In whatever the case, once the audience segment has been loaded into an ADS 720, a segment notifier module 722 may notify a content provider distribution module 723 for targeting advertising campaigns to inform content providers that their audience segments are ready to be targeted on a campaign.

Generally, the audience obfuscation system 710 ingests active advertisement campaigns from all ADSs 720, including their associated audience segment target information. The audience segmentation workflow may ultimately result in audience segments being targetable on campaigns in a downstream ADS. In some embodiments, content providers may create these advertisement campaigns and then use them to target the audience segments.

In some embodiments, the audience obfuscation system 710 collects active campaign information from downstream ADS solutions so that there is visibility into what advertisement campaigns the content providers are conducting and what segments they are targeting. These integrations may differ by ADS 720 but generally include implementations like calling an Application Programming Interface (API) or ingesting a .csv file from an SSH File Transfer Protocol (SFTP). The hosting of active campaign data may provide a list of audience segments that the router 715 should include in outbound request URLs and may be limited to audience segments that are targeted on active campaigns where the inbound subscriber of the ad request is a member. Campaign data collection is important such that older audience segments are not included once the campaign they are targeted on expires. This functionality may be implemented with the segment expiration module 21

In some embodiments, the audience obfuscation system 710 links subscriber_id to segment_name data by content provider 711 for all segment names attached to active campaigns. This data may be utilized during ad request modification. Generally, this is a data manipulation step that allows the router 715 to perform a lookup from a table in real-time using subscriber IDs and provider names to find the segment identifier(s) or name(s) it needs for an ad content request. This lookup table combines raw audience data from the content provider's data match vendor 722 and is limited to audiences targeted on the content provider's active campaign data collected from the ADS solutions. The table may include the subscriber_id, segment_name, segment_id, and provider name.

While the term "content distributor" generally suggests the distribution center or office of a cable television operator or MSO, the term is not intended to be so limited. The term content distributor as used herein is any system operable to deliver content to a user. For example, the term content distributor may encompass internet servers delivering content over the internet to a user of a device, such as a computer, a tablet, or a mobile phone. A content distributor may also refer to a telecom provider that distributes content to mobile phones and other devices. A content distributor can also refer to linear broadcast television, video on demand (VOD), and cable and satellite television. Also, the term "asset," as used herein, includes any type of media for which an owner desires promotion. Examples of such include traditional television commercials, advertisements, streaming video commercials, promotional materials, marketing information, and the like. The term "content," as used herein is any type of media, such as audio and/or video, in which assets may be inserted. For example, the content operable within the delivery systems described herein may be streamed Internet audio/video, analog cable television feeds, digital cable television feeds, digital satellite television feeds, or digital satellite radio feeds. Thus, the content has described herein is intended to encompass linear content and Video on Demand (VOD) found in modern cable television including pay-per-view (PPV) content delivered by both modern cable television and satellite television.

While the invention has been illustrated and described in detail in the drawings and foregoing description, such illustration and description are to be considered as exemplary and not restrictive in character. Certain embodiments described hereinabove may be combinable with other described embodiments and/or arranged in other ways. Accordingly, it should be understood that only the preferred embodiment and variants thereof have been shown and described and that all changes and modifications that come within the spirit of the invention are desired to be protected.

What is claimed is:

1. A network device communicatively coupled to a plurality of content distributors and to a plurality of advertisement decision servers (ADSs), wherein the network device is configured to:

receive a first set of requests from a first content distributor of the plurality of content distributors for advertisements to be inserted into first content provided by the first content distributor;

detect, in the first set of requests, Personally Identifiable Information (PII) of subscribers associated with the first content distributor;

based in part on the PII of the subscribers associated with the first content distributor, identify one or more audience segments to which the subscribers associated with the first content distributor belong;

based on determining that the first content distributor is not associated with a first ADS of the plurality of ADSs, remove the PII from the first set of requests to anonymize the first set of requests;

send the anonymized first set of requests with the audience segments to the first ADS;

receive at least one first advertisement from the first ADS for placement into the first content; and cause the first content distributor to insert the at least one first advertisement into the first content.

2. The network device of claim 1, wherein the network device is further configured to:

receive a second set of requests from a second content distributor of the plurality of content distributors for advertisements to be inserted into second content provided by the second content distributor, detect, in the second set of requests, PII of subscribers associated with the second content distributor, based on determining that the second content distributor is associated with a second ADS of the plurality of ADSs, send the second set of requests with the PII of the subscribers associated with the second content distributor to the second ADS, receive at least one second advertisement from the second ADS for placement into the second content, and cause the second content distributor to insert the at least one second advertisement into the second content.

3. The network device of claim 1, wherein:

the audience segments distinguish the subscribers associated with the first content distributor based on at least one of a previous purchase, a desired purchase, a demographic, or a genre of the first content.

4. The network device of claim 1, wherein the first set of requests comprises at least one society of cable telecommunications engineers (SCTE) request.

5. The network device of claim 4, wherein the network device is further configured to translate the at least one SCTE request into a video ad serving template (VAST) request based on determining that the first ADS is configured to receive VAST requests.

6. The network device of claim 1, wherein the network device is configured to receive the at least one first advertisement from the first ADS based on:

receiving, from the first ADS, at least one of a video ad serving template (VAST) response comprising the at least one first advertisement or a video multiple ad playlist (VMAP) response comprising the at least one first advertisement.

7. The network device of claim 6, wherein the network device is configured to cause the first content distributor to insert the at least one first advertisement into the first content based on:

extracting the at least one first advertisement from the VAST response or the VMAP response;

generating a society of cable telecommunications engineers (SCTE) response based on the extracted at least one first advertisement; and sending, to the first content distributor, the SCTE response.

8. A method comprising:

receiving, by a network device communicatively coupled to a plurality of content distributors and to a plurality of advertisement decision servers (ADSs), a first set of requests from a first content distributor of the plurality of content distributors for advertisements to be inserted into first content provided by the first content distributor;

detecting, in the first set of requests, Personally Identifiable Information (PII) of subscribers associated with the first content distributor;

based in part on the PII of the subscribers associated with the first content distributor, identifying one or more audience segments to which the subscribers associated with the first content distributor belong;

based on determining that the first content distributor is not associated with a first ADS of the plurality of ADSs, removing the PII from the first set of requests to anonymize the first set of requests;

sending the anonymized first set of requests with the audience segments to the first ADS;

receiving at least one first advertisement from the first ADS for placement into the first content; and causing the first content distributor to insert the at least one first advertisement into the first content.

9. The method of claim 8, further comprising:

receiving a second set of requests from a second content distributor of the plurality of content distributors for advertisements to be inserted into second content provided by the second content distributor;

detecting, in the second set of requests, PII of subscribers associated with the second content distributor;

based on determining that the second content distributor is associated with a second ADS of the plurality of ADSs, sending the second set of requests with the PII of the subscribers associated with the second content distributor to the second ADS;

receiving at least one second advertisement from the second ADS for placement into the second content, and causing the second content distributor to insert the at least one second advertisement into the second content.

10. The method of claim 8, wherein the audience segments distinguish the subscribers associated with the first content distributor based on at least one of a previous purchase, a desired purchase, a demographic, or a genre of the first content.

11. The method of claim 8, wherein the first set of requests comprises at least one society of cable telecommunications engineers (SCTE) request.

12. The method of claim 11, further comprising: translating the at least one SCTE request into a video ad serving template (VAST) request based on determining that the first ADS is configured to receive VAST requests.

13. The method of claim 8, wherein receiving the at least one first advertisement from the first ADS comprises: receiving, from the first ADS, at least one of a video ad serving template (VAST) response comprising the at least one first advertisement or a video multiple ad playlist (VMAP) response comprising the at least one first advertisement.

14. The method of claim 13, wherein causing the first content distributor to insert the at least one first advertisement into the first content comprises:

extracting the at least one first advertisement from the VAST response or the VMAP response;

generating a society of cable telecommunications engineers (SCTE) response based on the extracted at least one first advertisement; and sending, to the first content distributor, the SCTE response.

15. A computer-readable medium storing instructions that, when executed, cause:

receiving, by a network device communicatively coupled to a plurality of content distributors and to a plurality of advertisement decision servers (ADSs), a first set of requests from a first content distributor of the plurality of content distributors for advertisements to be inserted into first content provided by the first content distributor;

detecting, in the first set of requests, Personally Identifiable Information (PII) of subscribers associated with the first content distributor;

based in part on the PII of the subscribers associated with the first content distributor, identifying one or more audience segments to which the subscribers associated with the first content distributor belong;

based on determining that the first content distributor is not associated with a first ADS of the plurality of ADSs, removing the PII from the first set of requests to anonymize the first set of requests;

sending the anonymized first set of requests with the audience segments to the first ADS;

receiving at least one first advertisement from the first ADS for placement into the first content; and causing the first content distributor to insert the at least one first advertisement into the first content.

16. The computer-readable medium of claim 15, wherein the instructions, when executed, further cause:

receiving a second set of requests from a second content distributor of the plurality of content distributors for advertisements to be inserted into second content provided by the second content distributor;

detecting, in the second set of requests, PII of subscribers associated with the second content distributor;

based on determining that the second content distributor is associated with a second ADS of the plurality of ADSs, sending the second set of requests with the PII of the subscribers associated with the second content distributor to the second ADS;

receiving at least one second advertisement from the second ADS for placement into the second content, and causing the second content distributor to insert the at least one second advertisement into the second content.

17. The computer-readable medium of claim 15, wherein the audience segments distinguish the subscribers associated with the first content distributor based on at least one of a previous purchase, a desired purchase, a demographic, or a genre of the first content.

18. The computer-readable medium of claim 15, wherein the first set of requests comprises at least one society of cable telecommunications engineers (SCTE) request, and wherein the instructions, when executed, further cause: translating the at least one SCTE request into a video ad serving template (VAST) request based on determining that the first ADS is configured to receive VAST requests.

19. The computer-readable medium of claim 15, wherein the instructions that, when executed, cause receiving the at least one first advertisement from the first ADS comprise instructions that, when executed, cause receiving, from the first ADS, at least one of a video ad serving template (VAST) response comprising the at least one first advertisement or a video multiple ad playlist (VMAP) response comprising the at least one first advertisement.

20. The computer-readable medium of claim 19, wherein the instructions that, when executed, cause causing the first content distributor to insert the at least one first advertisement into the first content comprise instructions that, when executed, cause:

extracting the at least one first advertisement from the VAST response or the VMAP response;

generating a society of cable telecommunications engineers (SCTE) response based on the extracted at least one first advertisement; and sending, to the first content distributor, the SCTE response.

* * * * *